US011149777B2

(12) United States Patent
Madru et al.

(10) Patent No.: US 11,149,777 B2
(45) Date of Patent: Oct. 19, 2021

(54) INTELLIGENT BOLTS AND METHODS OF THEIR USE

(71) Applicant: Strain Labs AB, Stockholm (SE)

(72) Inventors: Csaba Madru, Häljarp (SE); Matts Lilja, Helsingborg (SE)

(73) Assignee: Strain Labs AB, Stockholm (SE)

( * ) Notice: Subject to any disclaimer, the term of this patent is extended or adjusted under 35 U.S.C. 154(b) by 326 days.

(21) Appl. No.: 16/320,299

(22) PCT Filed: Jul. 17, 2017

(86) PCT No.: PCT/SE2017/050788
§ 371 (c)(1),
(2) Date: Jan. 24, 2019

(87) PCT Pub. No.: WO2018/030942
PCT Pub. Date: Feb. 15, 2018

(65) Prior Publication Data
US 2019/0271349 A1 Sep. 5, 2019

(30) Foreign Application Priority Data

Aug. 8, 2016 (SE) .................................... 1630186-3

(51) Int. Cl.
*F16B 31/02* (2006.01)
*G01B 11/16* (2006.01)
(Continued)

(52) U.S. Cl.
CPC ............ *F16B 31/025* (2013.01); *F16B 31/02* (2013.01); *G01B 11/16* (2013.01);
(Continued)

(58) Field of Classification Search
CPC .. F16B 31/025; F16B 2031/022; G01B 11/16; G01B 11/18; H02J 7/025;
(Continued)

(56) References Cited

U.S. PATENT DOCUMENTS 2,600,029 A * 6/1952 Stone .................... F16B 31/025
73/761
3,602,186 A * 8/1971 Popenoe ................. F16B 31/02
411/13

(Continued)

FOREIGN PATENT DOCUMENTS

CN 2537954 Y 2/2003
CN 204610526 U 9/2015
(Continued)

OTHER PUBLICATIONS

NPL#1: Johanna Nieminen, How Low Energy is Bluetooth Low Energy?, Nokia Research Center, Jul. 14, 2015, <https://web.archive.org/web/20150714074042/https://www.eecs.umich.edu/courses/eecs589/papers/06215496.pdf> (Year: 2015).*

(Continued)

*Primary Examiner* — Victor D Batson
*Assistant Examiner* — Amit Singh Dhillon
(74) *Attorney, Agent, or Firm* — Ziegler IP Law Group, LLC

(57) ABSTRACT

An intelligent bolt includes a head region and a threaded region. The head region includes a bolt cavity. A distance between the head region and a bottom end of the cavity changes in operation as a function of longitudinal stress applied between the threaded region and the head region, and the bolt includes a sensor arrangement for measuring changes in the distance. A distal end of the sensor arrangement is disposed adjacent to the bottom end, wherein changes in spatial position of the bottom end relative to the distal end occur as a function of changes in the stress applied to the bolt to define a gap "G" whose size varies depending upon the stress. Interrogating radiation transmission in operation via the gap "G" from a source to a corresponding radiation sensor of the arrangement generates a stress mea- (Continued)

surement signal that is processed for wireless communication.

29 Claims, 12 Drawing Sheets

(51) Int. Cl.
*H02J 7/02* (2016.01)
*H02S 99/00* (2014.01)

(52) U.S. Cl.
CPC ......... *F16B 2031/022* (2013.01); *H02J 7/025* (2013.01); *H02S 99/00* (2013.01)

(58) Field of Classification Search
CPC ......... H02S 99/00; G01L 3/1464; G01L 5/24; G01S 17/06
USPC .......................................................... 73/761
See application file for complete search history.

(56) References Cited

U.S. PATENT DOCUMENTS

| | | | | |
|---|---|---|---|---|
| 3,850,133 | A * | 11/1974 | Johnson | G01L 5/24 116/212 |
| 3,964,299 | A * | 6/1976 | Johnson | F16B 31/025 116/272 |
| 3,987,699 | A * | 10/1976 | Popenoe | F16B 31/025 411/13 |
| 4,114,428 | A * | 9/1978 | Popenoe | G01B 7/22 331/65 |
| 4,447,388 | A * | 5/1984 | Sutton, Jr. | G01M 3/20 376/245 |
| 4,553,124 | A | 11/1985 | Malicki | |
| 4,686,859 | A * | 8/1987 | Wallace | B25B 23/14 411/14 |
| 5,945,665 | A * | 8/1999 | Hay | G01B 11/18 250/227.14 |
| 6,351,997 | B1 | 3/2002 | Loffler | |
| 7,628,079 | B2 * | 12/2009 | Sato | G01L 5/24 73/761 |
| 7,994,901 | B2 * | 8/2011 | Malis | B60B 3/16 340/426.33 |
| 8,448,520 | B1 | 5/2013 | Baroudi et al. | |
| 9,429,485 | B1 * | 8/2016 | Cavallaro | G01L 1/16 |
| 9,677,593 | B2 * | 6/2017 | Hsieh | G01L 5/24 |
| 2007/0017295 | A1 * | 1/2007 | Ohta | G01L 5/24 73/761 |
| 2009/0024272 | A1 * | 1/2009 | Rogers | G01B 11/2755 701/31.4 |
| 2010/0050778 | A1 | 3/2010 | Herley et al. | |
| 2011/0181393 | A1 * | 7/2011 | Tillotson | F16B 31/02 340/10.1 |
| 2012/0013471 | A1 * | 1/2012 | Jones | G01K 7/00 340/584 |
| 2012/0191378 | A1 | 7/2012 | Chu et al. | |
| 2013/0068031 | A1 * | 3/2013 | Mekid | F16B 31/02 73/761 |
| 2013/0188168 | A1 | 7/2013 | Hartog et al. | |
| 2017/0218999 | A1 * | 8/2017 | Brown | C21D 1/26 |

FOREIGN PATENT DOCUMENTS

| | | |
|---|---|---|
| DE | 10259527 A1 | 7/2004 |
| DE | 102015115894 A1 | 5/2016 |
| EP | 2806257 A1 | 11/2014 |
| WO | 03/021115 A1 | 3/2003 |
| WO | 2015150544 A2 | 10/2015 |

OTHER PUBLICATIONS

International Search Report, Application No. PCT/SE2017/050788, dated Oct. 12, 2017, 3 pages.
International Prelimianry Report on Patentability and Written Opinion of the International Searching Authority, Application PCT/SE2017/050788, dated Feb. 12, 2019, 7 pages.
Swedish Patent and Registration Office, Search Report, Application No. SE1630186-3, dated Mar. 13, 2017, 3 pages.

\* cited by examiner

INTELLIGENT BOLTS AND METHODS OF THEIR USE

TECHNICAL FIELD

The present disclosure relates to intelligent bolts having inbuilt-sensing functionality to measure strains applied in operation to the intelligent bolts; the intelligent bolts are operable to function as intelligent fasteners. Moreover, the present disclosure relates to methods of measuring strains applied to aforesaid intelligent bolts when in operation. Furthermore, the present disclosure relates to methods of manufacturing aforesaid intelligent bolts.

BACKGROUND

Rivets and bolted joints have been employed to join parts together for over a century. However, bolted joints provide an advantage in comparison to rivets in that they can be applied more rapidly than rivets, require less stress applied to parts when joining them together than rivets, and are susceptible to being later removed. However, bolted joints require a pre-load to be applied thereto, namely a static stress resulting in a corresponding static strain, in order to avoid the bolted joints becoming loose in operation, for example as a result of the bolted joints being exposed to vibration. When bolted joints fail on account of working loose, potentially dangerous situations can arise if respective parts that the bolted joints are required to hold together become mutually detached.

As aforementioned, during tightening of a given bolt, an axial force referred to as "pre-load", is applied to the given bolt. In other words, "pre-load" is a force keeping the given bolt joined to its corresponding nut or threaded hole. If the pre-load has a magnitude that is insufficient, then the given bolt and its corresponding not or threaded hole will loosen and its fastening functionality will be lost, namely the given bolt will fail in operation.

Loss of such pre-load is a frequently-encountered phenomena encountered for bolted joints. The causes of permanent loss of pre-load includes slackening, which is a result of settling between contact surfaces of the given bolt and its corresponding nut or threaded hole, material relaxation of parts that are clamped by the given bolt and its corresponding nut or threaded hole, and material creeping that arises when the given bolt and its corresponding nut or threaded hole are operated at elevated temperatures. Another cause of permanent loss of pre-load may include self-loosening, for example resulting from vibration and/or dynamic loads which cause the given bolt and its corresponding nut or threaded hole to rotate relative to one another in an untightening direction of rotation. Thermal expansion and contraction are also causes of change in aforesaid pre-load, but are normally not permanent, for example when the given bolt and its corresponding nut return to their usual operating temperature.

On account of the foregoing, it is customary practice in many contemporary industries to inspect fasteners including bolts and nuts, or bolts and corresponding threaded holes, on a periodic basis, to ensure that they have not worked loose. Moreover, is also known to employ secondary features, for example polymeric glue applied to bolt threads or nylon collars, to prevent a nut or corresponding threaded hole becoming totally detached from its corresponding bolt, but such approaches are not satisfactory for ensuring that parts clamped by the bolt and its nut or threaded hole are no longer tightly clamped together, especially at elevated temperatures at which polymeric glue or nylon collars melt or decompose.

Contemporary approaches to address an issue of inspecting bolted joints to detect any loss of pre-load are not satisfactory. There are two known methods that are employed to inspect a given bolted joint. A first method includes performing a torque check, wherein a torque wrench is used to rotate a bolt and/or nut of the given bolted joint in a tightening direction of rotation. However, there is no standard or written accepted practice regarding how to perform such a torque check. Furthermore, a relationship between torque and pre-load depends on a friction coefficient in threads of the bolt and a friction coefficient of surfaces under a head of the bolt and the nut or threaded hole. After installation of the given bolted joint, the aforesaid friction coefficient is, in practice, unknown and it is thereby impossible to determine the bolt pre-load to any degree of accuracy. A second method includes hammering the bolt and, by listening to a corresponding sound feed-back, trying to determine whether or not the bolted joint is loose, for example by performing a Fourier spectrum analysis of the corresponding sound feed-back and comparing with a Fourier spectrum template.

Thus, a loss of pre-load in a bolted joint is a well-known problem, and is presently addressed in most industries by performing periodic inspections. These periodic inspections are usually expensive, potentially hazardous, result in downtime, and cannot easily generate quantifiable inspection results. Moreover, on account of a need for specialist tools for implementing such inspections, specialist staff and equipment must be transported to inspection sites.

In a publication WO 2015/150544 A2, there is described an intelligent bolt including a bolt cavity therein, wherein a laser attached near a head of the intelligent bolt is used to interrogate a bottom end of the bolt cavity that is remote from the head of the intelligent bolt, wherein a change in distance between the bottom end of the bolt cavity and the head of the bolt varies as the bolt is strained as a result of a longitudinal stress being applied to the intelligent bolt, and wherein a change in the distance is measured in order to provide a corresponding measure of pre-load, namely the pre-load is determined by measuring a change of distance between a laser probe and the bottom end of the bolt cavity.

Although, the aforesaid intelligent bolt functions to measure the pre-load, and also changes in the pre-load as a function of passing time, the intelligent bolt is relatively complex in its construction and therefore relatively costly to manufacture. Such complexity arises, for example, from the laser of the intelligent bolt being mounted at a top end of the bolt, namely substantially at the head of the intelligent bolt, and a fiber bundle is used to transport a laser beam generated in operation by the laser down to the bottom end of the cavity; manual assembly work is required to connect the individual fibers of the fiber bundle to a control unit at the top of the intelligent bolt. Moreover, when modifying a standard solid bolt to provide the cavity for the intelligent bolt, considerable machining work is required, that can be time-consuming when the solid bolt is fabricated from a hard material, for example stainless steel, Hastelloy-N® or similar.

Therefore, it will be appreciated from the foregoing that there is a need for an improved intelligent bolts to address the aforementioned drawbacks of known types of fasteners.

SUMMARY

The present disclosure seeks to provide an improved intelligent bolt including a head region coupled to a threaded region, for example via an unthreaded or threaded neck region.

Moreover, the present disclosure seeks to provide a method of using an intelligent bolt including a head region coupled to a threaded region, for example via an unthreaded or threaded neck region.

Furthermore, the present disclosure seeks to provide a computer program product comprising a non-transitory computer-readable storage medium having computer-readable instructions stored thereon, the computer-readable instructions being executable by a computerized device comprising processing hardware to execute a method of using an intelligent bolt including a head region coupled to a threaded region, for example via an unthreaded or threaded neck region.

According to a first aspect, there is provided an intelligent bolt including a head region coupled to a threaded region, wherein the head region includes a bolt cavity, wherein a distance between the head region and a bottom end of the bolt cavity changes in operation as a function of a longitudinal stress applied between the threaded region and the head region, and wherein the intelligent bolt includes a sensor arrangement for measuring changes in the distance between the head region and the bottom end of the bolt cavity, characterized in that:

the sensor arrangement is mounted in the head region, such that the sensor arrangement is spatially referenced in respect of the head region; and a distal end of the sensor arrangement is disposed adjacent to the bottom end of the bolt cavity to define a gap (G) therebetween, such that the gap (G) varies in size in response to changes in spatial position of the bottom end of the bolt cavity relative to the distal end of the sensor arrangement as a function of changes in a longitudinal stress applied to the intelligent bolt, wherein interrogating radiation transmission in operation via the gap (G) from a source of interrogating radiation of the sensor arrangement to a corresponding radiation sensor of the sensor arrangement generates a stress measurement signal from the radiation sensor that is processed within the sensor arrangement for wireless communication from the intelligent bolt.

The intelligent bolt is of advantage in that measurement of stress applied to the intelligent bolt by employing measurement of radiation transmission occurring in operation via the gap (G) enables the intelligent bolt to be manufactured more simply and more economically.

Optionally, the bolt cavity extends from the head region into the threaded region.

Optionally, the sensor arrangement is mounted within a recess formed into the head region, and the bolt cavity extends from a bottom surface of the recess into the intelligent bolt.

Optionally, the bolt cavity is formed symmetrically, namely centrally, along an elongate central axis of the intelligent bolt. Alternatively, the bolt cavity of formed asymmetrically, namely off-centre, and an elongate axis of the bolt cavity is substantially parallel to the elongate central axis of the intelligent bolt. Such an arrangement is capable of measuring asymmetries in pre-load applied to the small bolt when in operation.

Optionally, the sensor arrangement includes a power supply arrangement and a data processing arrangement, wherein the data processing arrangement is provided in operation with power from the power supply arrangement, and wherein the data processing arrangement is operable to function in at least a "sleep state" and an "active state", wherein the data processing arrangement is operable to process the stress measurement signal to generate corresponding measurement data and to transmit the measurement data wirelessly from the intelligent bolt when in the "active state", and to conserve power when in the "sleep state" by ceasing sending wireless transmissions from the intelligent bolt.

Optionally, the sensor arrangement is operable to switch between the "sleep state" and the "active state" in a cyclical manner, to provide a temporal sequence of stress measurement data transmitted wirelessly from the intelligent bolt.

Optionally, the sensor arrangement is in an initial dormant state, and is switchable for use into the "sleep state" and/or the "active state".

Optionally, the sensor arrangement consumes in the "sleep state" less than 1% of power consumed by the sensor arrangement in the "active state".

Optionally, the sensor arrangement consumes in the "sleep state" less than 0.1% of power consumed by the sensor arrangement in the "active state".

Optionally, the sensor arrangement is operable to be temporally more than 99% of its operating time in the "sleep state", relative to the "active state".

Optionally, the sensor arrangement includes a digital clock for defining a period between repetitions of the "active state" being employed.

Optionally, the sensor arrangement includes a power supply arrangement including a battery.

Optionally, the power supply arrangement further includes a power harvesting arrangement for harvesting energy from an external environment to the intelligent bolt, wherein the power harvesting arrangement includes at least one of: solar collector, a resonant inductive charger, a wireless energy charger including a voltage step-up transformer arrangement.

Optionally, the sensor arrangement includes an antenna arrangement that is disposed at an upper exposed surface of the sensor arrangement when mounted within the head region.

Optionally, the sensor arrangement is implemented as a unitary component that is installed by insertion of at least a portion of the sensor arrangement into the bolt cavity.

Optionally, the sensor arrangement is operable to implement wireless communication of the processed stress measurement signal is implemented in a peer-to-peer (P2P) manner, and that the sensor arrangement is operable to function as a peer-to-peer (P2P) communication node for relaying peer-to-peer (P2P) transmissions.

Optionally, the intelligent bolt has its head region and its threaded region fabricated from at least one of: a metal, a metal alloy, a sintered metal powder material, a ceramic material, a plastics material, a polymeric material, an amorphous material.

Optionally, the intelligent bolt is arranged to be operable in an aquatic environment, and to transmit its processed measurement signal via a conductive communication path external to the intelligent bolt using capacitive coupling of its processed measurement signal from the sensor arrangement to the conductive communication path.

Optionally, the sensor arrangement is encapsulated in polymeric plastics material, and is secured within the intelligent bolt using adhesive.

Optionally, the sensor arrangement further comprises:

the source of interrogating radiation for illuminating the bottom end of the bolt cavity;

the radiation sensor for receiving radiation returned from the bottom end of the bolt cavity for measuring an elongation of the intelligent bolt;

a data processing arrangement for receiving the measurement signal from the radiation sensor, wherein the data processing arrangement is provided with wireless communication functionality by employing a low-power microcontroller with an in-built wireless communication functionality; and the power supply arrangement, for providing operating electrical power for the data processing arrangement and the source of interrogating radiation, further comprises at least one of: a plurality of capacitors, a plurality of non-rechargeable batteries, a plurality of rechargeable batteries, a plurality of solar cells, a plurality of resonant inductive power coupling arrangements for providing power to the intelligent bolt.

Optionally, the in-built wireless communication functionality is provided by using BlueTooth®.

Optionally, the source of interrogating radiation (200A) further comprises at least one of a solid-state laser, a light emitting diode, and a nanowire radiation source.

Optionally, the data processing arrangement is configured to:

process the measurement signal by using a differential measurement of radiation from the source of interrogating radiation (200A) using a first element and a second element wherein the first element provides a measure of a magnitude of radiation from the source of interrogating radiation (200A), and the second elements provides a measure of radiation from the source of interrogating radiation (200A) transmitted via the gap (G); and process the measurement signal by linearization of measurement results using at least one of a spline algorithm.

Optionally, the intelligent bolt is communicably coupled to at least one remote device via a communication network, and wherein the intelligent bolt is operable to transmit data pertaining thereto, to the at least one remote device, wherein the data pertaining to the intelligent bolt comprises at least one of: (i) the stress measurement signal, (ii) the processed stress measurement signal, (ii) operating state of the intelligent bolt, further wherein the at least one remote device is operable to process the data pertaining to the intelligent bolt, to monitor and/or control the intelligent bolt.

Optionally, the at least one remote device is operable to store the data pertaining to the intelligent bolt.

Optionally, the at least one remote device is selected from a group consisting of: a computing device, a server, a database, an Internet of Things (IoT) device, a Programmable Logic Controller (PLC) unit.

Optionally, the sensor arrangement is mountable in a bolt cavity of an intelligent bolt including a head region coupled to a threaded region, wherein a distance between the head region and a bottom end of the bolt cavity changes in operation as a function of longitudinal stress applied between the threaded region and the head region, and wherein the sensor arrangement is operable to measure changes in the distance between the head region and the bottom end of the bolt cavity, wherein:

the sensor arrangement is mountable in the head region such that the sensor arrangement is spatially referenced in respect of the head region; and a sensor arrangement is mountable so that the distal end of the sensor arrangement is disposed adjacent to the bottom end of the bolt cavity such that changes in spatial position of the bottom end of the bolt cavity relative to the distal end of the sensor arrangement occur as a function of changes in longitudinal stress applied to the intelligent bolt to define a gap whose size varies according to the changes in the longitudinal stress, wherein the sensor arrangement is operable to provide for interrogating radiation transmission in operation via the gap from a source of interrogating radiation of the sensor arrangement to a corresponding radiation sensor of the sensor arrangement to generate a stress measurement signal from the radiation sensor that is processable within the sensor arrangement for wireless communication from the intelligent bolt.

According to a second aspect, there is provided a method of using an intelligent bolt including a head region coupled to a threaded region, wherein the head region includes a bolt cavity, wherein a distance between the head region and a bottom end of the bolt cavity changes in operation as a function of longitudinal stress applied between the threaded region and the head region, and wherein the intelligent bolt includes a sensor arrangement for measuring changes in the distance between the head region and the bottom end of the bolt cavity, characterized in that the method includes:

arranging for the sensor arrangement to be mounted in the head region such that the sensor arrangement is spatially referenced in respect of the head region; and arranging for a distal end of the sensor arrangement to be disposed adjacent to the bottom end of the bolt cavity to define a gap (G) therebetween, such that a size of the gap (G) changes in response to changes in spatial position of the bottom end of the bolt cavity relative to the distal end of the sensor arrangement that occur as a function of changes in longitudinal stress applied to the intelligent bolt, wherein interrogating radiation transmission in operation via the gap (G) from a source of interrogating radiation of the sensor arrangement to a corresponding radiation sensor of the sensor arrangement generates a stress measurement signal from the radiation sensor that is processed within the sensor arrangement for wireless communication from the intelligent bolt.

According to a third aspect, there is provided a computer program product comprising a non-transitory computer-readable storage medium having computer-readable instructions stored thereon, the computer-readable instructions being executable by a computerized device comprising processing hardware to execute a method of using an intelligent bolt including a head region coupled to a threaded region as disclosed hereinabove.

It will be appreciated that features of the invention are susceptible to being combined in various combinations without departing from the scope of the invention as defined by the appended claims.

Embodiments of the present disclosure substantially eliminate or at least partially address the aforementioned problems in the prior art, and enables automatic inspection and reporting of its operating status, in particular a measurement of the pre-load of the intelligent bolt.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
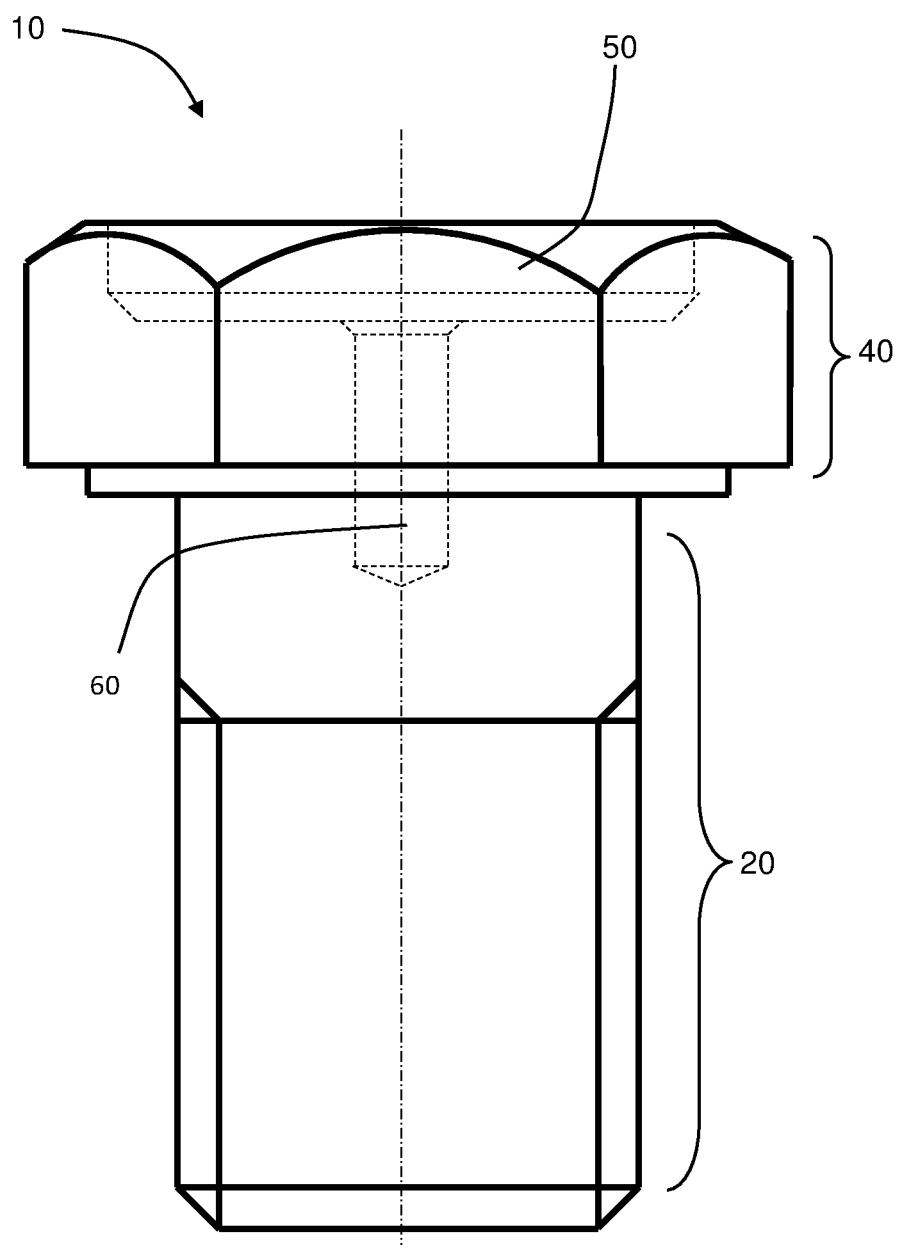
FIG. 1 is an illustration of an intelligent bolt pursuant to an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, there is provided an intelligent bolt including a head region coupled to a threaded region, wherein the head region includes a bolt cavity, wherein a distance between the head region and a bottom end of the bolt cavity changes in operation as a function of a longitudinal stress applied between the threaded region and the head region, and wherein the intelligent bolt includes a sensor arrangement for measuring changes in the distance between the head region and the bottom end of the bolt cavity, characterized in that:

the sensor arrangement is mounted in the head region, such that the sensor arrangement is spatially referenced in respect of the head region; and a distal end of the sensor arrangement is disposed adjacent to the bottom end of the bolt cavity to define a gap (G) therebetween, such that the gap (G) varies in size in response to changes in spatial position of the bottom end of the bolt cavity relative to the distal end of the sensor arrangement as a function of changes in a longitudinal stress applied to the intelligent bolt, wherein interrogating radiation transmission in operation via the gap (G) from a source of interrogating radiation of the sensor arrangement to a corresponding radiation sensor of the sensor arrangement generates a stress measurement signal from the radiation sensor that is processed within the sensor arrangement for wireless communication from the intelligent bolt.

The intelligent bolt is of advantage in that measurement of stress applied to the intelligent bolt by employing measurement of radiation transmission occurring in operation via the gap (G) enables the intelligent bolt to be manufactured more simply and more economically.

Optionally, for the intelligent bolt, the bolt cavity extends from the head region into the threaded region.

Optionally, for the intelligent bolt, the sensor arrangement is mounted within a recess of the head region, and the bolt cavity extends from a bottom surface of the recess into the intelligent bolt.

Optionally, for the intelligent bolt, the sensor arrangement includes a power supply arrangement and a data processing arrangement, wherein the data processing arrangement is provided in operation with power from the power supply arrangement, and wherein the data processing arrangement is operable to function in at least a "sleep state" and an "active state", wherein the data processing arrangement is operable to process the stress measurement signal to generate corresponding measurement data and to transmit the measurement data wirelessly from the intelligent bolt when in the "active state", and to conserve power when in the "sleep state" by ceasing sending wireless transmissions from the intelligent bolt.

More optionally, for the intelligent bolt, the sensor arrangement is operable to switch between the "sleep state" and the "active state" in a cyclical manner, to provide a temporal sequence of stress measurement data transmitted wirelessly from the intelligent bolt.

More optionally, for the intelligent bolt, the sensor arrangement is in an initial dormant state, and is switchable for use into the "sleep state" and/or the "active state".

More optionally, for the intelligent bolt, the sensor arrangement consumes in the "sleep state" less than 1% of power consumed by the sensor arrangement in the "active state".

More optionally, for the intelligent bolt, the sensor arrangement consumes in the "sleep state" less than 0.1% of power consumed by the sensor arrangement in the "active state".

More optionally, for the intelligent bolt, the sensor arrangement is operable to be temporally more than 99% of its operating time in the "sleep state", relative to the "active state".

More optionally, for the intelligent bolt, the sensor arrangement includes a digital clock for defining a period between repetitions of the "active state" being employed.

Optionally, for the intelligent bolt, the sensor arrangement includes a power supply arrangement including a battery.

More optionally, for the intelligent bolt, the power supply arrangement further includes a power harvesting arrangement for harvesting energy from an external environment to the intelligent bolt, wherein the power harvesting arrangement includes at least one of: a solar collector, a resonant inductive charger, a wireless energy charger including a voltage step-up transformer arrangement.

Optionally, for the intelligent bolt, the sensor arrangement includes an antenna arrangement that is disposed at an upper exposed surface of the sensor arrangement when mounted within the head region.

Optionally, for the intelligent bolt, the sensor arrangement is implemented as a unitary component that is installed by insertion of at least a portion of the sensor arrangement into the bolt cavity.

Optionally, for the intelligent bolt, the sensor arrangement is operable to implement wireless communication of the processed stress measurement signal in a peer-to-peer (P2P) manner, and that the sensor arrangement is operable to function as a peer-to-peer (P2P) communication node for relaying peer-to-peer (P2P) transmissions.

Optionally, the intelligent bolt has its head region and its threaded region fabricated from at least one of: a metal, a metal alloy, a sintered metal powder material, a ceramic material, a plastics material, a polymeric material, an amorphous material.

Optionally, the intelligent bolt is arranged to be operable in an aquatic environment, and to transmit its processed measurement signal via a conductive communication path external to the intelligent bolt using capacitive coupling of its processed measurement signal from the sensor arrangement to the conductive communication path.

Optionally, for the intelligent bolt, the sensor arrangement is encapsulated in a polymeric plastics material, and is secured within the intelligent bolt using adhesive.

Optionally, for the intelligent bolt, the sensor arrangement further comprises:

the source of interrogating radiation for illuminating the bottom end of the bolt cavity;

the radiation sensor for receiving radiation returned from the bottom end of the bolt cavity for measuring an elongation of the intelligent bolt;

a data processing arrangement for receiving the measurement signal from the radiation sensor, wherein the data processing arrangement is provided with wireless communication functionality by employing a low-power microcontroller with an in-built wireless communication functionality; and the power supply arrangement, for providing operating electrical power for the data processing arrangement and the source of interrogating radiation, further comprises at least one of: a plurality of capacitors, a plurality of non-rechargeable batteries, a plurality of rechargeable batteries, a plurality of solar cells, a plurality of resonant inductive power coupling arrangements for providing power to the intelligent bolt.

Optionally, for the intelligent bolt, the in-built wireless communication functionality is provided by use of a near-field wireless communication protocol, for example by using BlueTooth®.

Optionally, for the intelligent bolt, the source of interrogating radiation further comprises at least one of a solid-state laser, a light emitting diode, and a nanowire radiation source. Other sources of interrogating radiation are feasible, for example luminescent sources, incandescent sources, and similar.

Optionally, for the intelligent bolt, the data processing arrangement is configured to:

process the measurement signal by using a differential measurement of radiation from the source of interrogating radiation using a first element and a second element wherein the first element provides a measure of a magnitude of radiation from the source of interrogating radiation, and the second elements provides a measure of radiation from the source of interrogating radiation transmitted via the gap (G); and process the measurement signal by linearization of measurement results using a polynomial algorithm, for example a spline algorithm.

Optionally, the intelligent bolt is communicably coupled to at least one remote device via a communication network, and wherein the intelligent bolt is operable to transmit data pertaining thereto, to the at least one remote device, wherein the data pertaining to the intelligent bolt comprises at least one of: (i) the stress measurement signal, (ii) the processed stress measurement signal, (ii) operating state of the intelligent bolt, further wherein the at least one remote device is operable to process the data pertaining to the intelligent bolt, to monitor and/or control the intelligent bolt.

Optionally, the at least one remote device is operable to store the data pertaining to the intelligent bolt.

Optionally, the at least one remote device is selected from a group consisting of: a computing device, a server, a database, an Internet of Things (IoT) device, a Programmable Logic Controller (PLC) unit.

In another aspect, there is provided a method of using an intelligent bolt including a head region coupled to a threaded region, wherein the head region includes a bolt cavity, wherein a distance between the head region and a bottom end of the bolt cavity changes in operation as a function of longitudinal stress applied between the threaded region and the head region, and wherein the intelligent bolt includes a sensor arrangement for measuring changes in the distance between the head region and the bottom end of the bolt cavity, characterized in that the method includes:

arranging for the sensor arrangement to be mounted in the head region such that the sensor arrangement is spatially referenced in respect of the head region; and arranging for a distal end of the sensor arrangement to be disposed adjacent to the bottom end of the bolt cavity to define a gap (G) therebetween, such that a size of the gap (G) changes in response to changes in spatial position of the bottom end of the bolt cavity relative to the distal end of the sensor arrangement that occur as a function of changes in longitudinal stress applied to the intelligent bolt, wherein interrogating radiation transmission in operation via the gap (G) from a source of interrogating radiation of the sensor arrangement to a corresponding radiation sensor of the sensor arrangement generates a stress measurement signal from the radiation sensor that is processed within the sensor arrangement for wireless communication from the intelligent bolt.

In yet another aspect, there is provided a computer program product comprising a non-transitory computer-readable storage medium having computer-readable instructions stored thereon, the computer-readable instructions being executable by a computerized device comprising processing hardware to execute the above method.

Embodiments of the present disclosure seek to provide an intelligent bolt, that is susceptible to being manufactured in large volumes at a relatively lower cost, namely as a "volume product" that does not require high accuracy during manufacture. In an embodiment, the terms "bolt" or "screw" or other related terms can be used interchangeably and are not necessarily limiting the scope of the present disclosure.

Furthermore, the intelligent bolt includes a head region coupled to a threaded region. In one embodiment, the intelligent bolt has its head region and its threaded region fabricated from at least one of: a metal, a metal alloy, a sintered metal powder material, a ceramic material, a polymeric material (for example PEEK), an amorphous material (for example an amorphous glass-like material).

The head region includes a bolt cavity of the intelligent bolt. In an embodiment, the bolt cavity extends from the head region into the threaded region. Furthermore, a distance between the head region and a bottom end of the bolt cavity may change in operation as a function of longitudinal stress applied between the threaded region and the head region of the intelligent bolt. In an embodiment, the intelligent bolt includes the head region, for example with hexagonally disposed engaging surfaces to receive a torque wrench, and a threaded region. In the head region, there is provided a recess for accommodating the aforementioned sensor arrangement. Moreover, the bolt cavity may extend from a bottom of the recess to approximately a middle of the threaded region.

Furthermore, the bolt cavity may be disposed along a central elongate axis of the intelligent bolt, but need not necessarily be so; for example, the bolt cavity is optionally off-axis, rather than being on-axis, allowing asymmetries in applied pre-load to be measured. For example, when the intelligent bolt is of relatively large size, for example M24 or larger, the intelligent bolts includes a plurality of bolt cavities, wherein each cavity is provided with its own sensor arrangement for measuring strain; such a plurality of bolt cavities enables pre-load asymmetries to be measured as well as centrally along a central elongate axis of the intelligent bolt. Moreover, using a plurality of bolt cavities, each with its own corresponding sensor arrangement for measuring strain, provides a high degree of operating reliability, because, in an event of one bolt cavity becoming inoperative, for example due to failure of its sensor arrangement, other of the bolt cavities and their associated sensor arrangement will be able to continue providing measurements, as described in the foregoing. Optionally, in an event of one of the plurality of bolt cavities and its associated sensor arrangement failing, the strain associated with the failed bolt cavity can be extrapolated by computation of stress in the other operative bolt cavities of the plurality of bolt cavities. The bolt cavity has a relatively small influence on a mechanical robustness and strength of the intelligent bolt in comparison to a corresponding conventional bolt of similar material to the intelligent bolt, but devoid of the bolt cavity therein. Optionally, the intelligent bolt may be implemented as a M10 bolt, or larger size than M10, in stainless steel alloy, sintered metal powder material or hard ceramic material, or even a polymeric material such as PEEK. In an example, the bolt cavity may have a longitudinal length of approximately twelve millimeters and a diameter of approximately five millimeters. Beneficially, the recess and the bolt cavity may be formed with chamfered edges, to avoid providing any stress raising points that could result in premature fracture of the intelligent bolt when stressed in operation.

To make the forming of the bolt cavity as easy and cost effective as possible, it is beneficial that cold forming of a bolt blank is used when manufacturing the intelligent bolt. However, the bolt cavity beneficially must protrude into a shank of the intelligent bolt where strain occurs when the intelligent bolt is subject to a longitudinal stress along its elongate axis. A mechanical strength of the intelligent bolt is determined by the threaded portion. In an example embodiment, the intelligent bolt includes a neck region corresponding to an unthreaded part of the shank of the intelligent bolt, for example; however, for certain bolts, the shank is also provided with a thread. In an embodiment, the shank is still stronger than the threaded portion. Furthermore, the recess in the head region of the intelligent bolt may not substantially affect the strength of the head region.

In one embodiment, the threaded region is operable to engage with a nut or a threaded hole, for example a threaded hole in a plate of metal, when the intelligent bolt is used to clamp parts together. It will be appreciated by those skilled in the art that terms "nut" or "threaded hole" or other related terms can be used interchangeably and are not limiting the scope of the present disclosure.

Furthermore, the intelligent bolt includes a sensor arrangement configured to measure changes in the distance between the head region and the bottom end of the bolt cavity. In an embodiment, the sensor arrangement is mounted in the head region such that the sensor arrangement is spatially referenced in respect of the head region. In one embodiment, a distal end of the sensor arrangement may be disposed adjacent to the bottom end of the bolt cavity such that changes in spatial position of the bottom end of the bolt cavity relative to the distal end of the sensor arrangement occurs as a function of changes in longitudinal stress applied to the intelligent bolt to define a gap "G" whose size may vary according to the changes in the longitudinal stress.

In an embodiment, the sensor arrangement further includes a source of interrogating radiation and a corresponding radiation sensor. Furthermore, an interrogating radiation transmission in operation via the gap "G" from the source of interrogating radiation of the sensor arrangement to the corresponding radiation sensor of the sensor arrangement may generate a stress measurement signal from the radiation sensor that is processed within the sensor arrangement for wireless communication from the intelligent bolt.

In one embodiment, the sensor arrangement can be implemented as a single unit and is operable to interrogate a bolt cavity that is pre-formed into the intelligent bolt. For example, when the intelligent bolt is initially forged or machined during manufacture. In an embodiment, the sensor arrangement is pushed into the bolt cavity during manufacture. Furthermore, the sensor arrangement is beneficially designed to be able to cope with relatively large variations in spatial dimensions of the bolt cavity, so that one design of sensor arrangement can be employed within a range of sized of intelligent bolts, for example from M8 to M30 sizes.

In one embodiment, the sensor arrangement is mounted in the head region of the intelligent bolt such that the sensor arrangement is spatially referenced in respect of the head region. Alternatively, the sensor arrangement may be mounted within a recess formed into the head region, and the bolt cavity may extend from a bottom surface of the recess into the intelligent bolt.

In one embodiment, the sensor arrangement includes an antenna arrangement disposed at an upper exposed surface of the sensor arrangement when mounted within the head region.

Furthermore, the sensor arrangement may be implemented as a unitary component that may be installed by insertion of at least a portion of the sensor arrangement into the bolt cavity. Furthermore, the sensor arrangement is configured to determine a pre-load in the intelligent bolt, and for wirelessly communicating sensed measurement data to a database. The database may be spatially remote from the intelligent bolt, for example communication of the sensed measurement data to the database may be done via use of GSM, Wi-Fi or other wireless networks. Furthermore, in an embodiment, the database is present in a computing device such as a computer located remotely from the intelligent bolt. Optionally, when a plurality of the intelligent bolts is mounted spatially mutually adjacently, the intelligent bolts are operable to transmit their sensed measurement data from one intelligent bolt to another in a peer-to-peer ("P2P") form of communication. Alternatively, or additionally, when multiple intelligent bolts are mounted or arranged spatially mutually adjacently, then the intelligent bolts are operable to transmit their sensed measurement data in an Ethernet form of communication. Alternatively, the intelligent bolts may transmit their data wirelessly in a communication channel that is common thereto; optionally, in an event that two or more intelligent bolts transmit their sensed measurement data simultaneously, such simultaneous transmission is detected and one or more further attempts to retransmit the sensed measurement data are then made after a waiting period. The waiting period may be a predefined waiting period for example, but not limiting to, 5 seconds, 10 seconds, 20 seconds, 1 minute, 30 minutes, and so forth. The Ethernet form of communication is highly relevant for sub-sea operation, where the intelligent bolts are sealed against ingress of salt water, and a communication path is provided via a conductor, for example a flexible polymer-coated wire or flat conductive track, that is routed in close proximity to the heads of each of the intelligent bolts for allowing wireless capacitive coupling of signals from the sensor arrangements of the intelligent bolts to the flexible polymer-coated wire or flat conductive track, and vice versa if required; the flexible polymer-coated wire or flat conductive track is routed to a data receiver that is operable to receive the sensed measurement data from the intelligent bolts and relay, or otherwise communicate, the data further to a database. Optionally, the flexible polymer-coated wire or flat conductive track is arranged to press-fit engage, for example span-press-fit engage, onto the heads of the intelligent bolts, for enabling rapid installation of the intelligent bolts to be achieved, for example by divers operating in a sub-sea environment, for example in an offshore oil and gas exploration and/or production facility. Optionally, operating power for the intelligent bolts, or at least for charging batteries and/or capacitors of the intelligent bolts, is also provided via the flexible polymer-coated wire or flat conductive track via a capacitively (i.e. electrostatically via establishment of an electric field) coupled alternating (AC) signal having a frequency spectrum that is different to that of measurement signals emitted by the intelligent bolts that are indicative of measured strain, and hence measured stress. Yet alternatively, the flexible polymer-coated wire or flat conductive track is periodically energized with an alternating (AC) signal that charges the battery and/or capacitor of the intelligent bolt. The intelligent bolt communicates its strain measurement data in "quiet" periods during which the alternating (AC) signal is not present.

In an embodiment, the sensor arrangement is intended to be installed into the bolt cavity formed inside, for example, standard mass-produced types of bolts/screws or stud bolts. In one embodiment, the sensor arrangement includes a source of interrogating radiation, a sensor, a data processing arrangement, and a power supply arrangement.

The source of interrogating radiation is configured to employ interrogating radiation. Examples of the source of interrogating radiation may include, but are not limited to, a solid-state laser, a light emitting diode, an organic light emitting diode, a (Plasmon-resonance) nanowire radiation source (wherein light may be emitted by Plasmon resonance in nanowires when an electrical current flows there through, to a quantum efficiency that can approach 50%), or similar. Furthermore, the interrogating radiation may be employed by the source for illuminating the bottom end of the bolt cavity.

In an embodiment, the sensor of the sensor arrangement is configured to receive radiation returned from the bottom end of the bolt cavity for measuring an elongation of the intelligent bolt. In an instance, a magnitude of the received radiation returned from the bottom end of the bolt cavity various as the intelligent bolt may undergo strain as a result of longitudinal stress being applied thereto.

Optionally, the intelligent bolt is communicably coupled to at least one remote device via a communication network, and wherein the intelligent bolt is operable to transmit data pertaining thereto, to the at least one remote device, wherein the data pertaining to the intelligent bolt comprises at least one of: (i) the stress measurement signal, (ii) the processed stress measurement signal, (ii) operating state of the intelligent bolt, further wherein the at least one remote device is operable to process the data pertaining to the intelligent bolt, to monitor and/or control the intelligent bolt. In such an instance, the communication network allows for the transmission of the data pertaining to the intelligent bolt, between the intelligent bolt and the at least one remote device.

Furthermore, optionally, the at least one remote device is operable to store the data pertaining to the intelligent bolt. In such an instance, the at least one remote device may store the data pertaining to the intelligent bolt in at least one memory unit associated with the at least one remote device.

Optionally, the communication network is a wireless communication network. Alternatively, optionally, the communication network is a wired communication network. In an embodiment, the communication network for communicably coupling the intelligent bolt and the at least one remote device includes, but is not limited to, Internet TCP/IP, Wi-Fi, cellular network, radio network, Bluetooth®, LoRa™, LoRaWAN™, Controller Area Network (CAN), Local Interconnected Network (LIN). It will be appreciated that in order to facilitate communication therebetween, both the intelligent bolt and the at least one remote device comprise communication modules that are compatible with each other, whilst also being compatible with the communication network. Moreover, optionally, the communication network is bidirectional. Therefore, the communication network allows for communication from the intelligent bolt to the at least one remote device, and from the at least one remote device to the intelligent bolt.

Optionally, the sensor arrangement comprises the communication module of the intelligent bolt. In such an instance, the sensor arrangement of the intelligent bolt is operable to transmit the data pertaining to the intelligent bolt, to the at least one remote device. Optionally, the data processing arrangement comprises the communication module of the intelligent bolt. In such an instance, the data processing arrangement of the intelligent bolt is operable to transmit the data pertaining to the intelligent bolt, to the at least one remote device. As an example, the data processing arrangement may include wireless communication components to implement the communication module of the intelligent bolt.

As mentioned previously, optionally, the data pertaining to the intelligent bolt comprises at least one of: (i) the processed stress measurement signal, (ii) operating state of the intelligent bolt. Optionally, in this regard, the operating state of the intelligent bolt comprises at least one of: the pre-load in the intelligent bolt, temperature of the intelligent bolt, operating time of the intelligent bolt, position of the intelligent bolt, ID reference of the intelligent bolt, intelligent bolt type, battery status of the intelligent bolt, intelligent bolt status, inspection interval of the intelligent bolt.

Moreover, optionally, the at least one remote device is selected from a group consisting of: a computing device, a server, a database, an Internet of Things (IoT) device, a Programmable Logic Controller (PLC) unit.

Furthermore, optionally, the intelligent bolt is communicably coupled to the at least one remote device via at least one network device. Examples of such network devices include, but are not limited to, a router, a concentrator card, a gateway. In such an instance, the data pertaining to the intelligent bolt is transmitted to the at least one network device, wherefrom such data is transmitted to the at least one remote device. Optionally, the data pertaining to the intelligent bolt is processed by the at least one network device and thereafter, transmitted to the at least one remote device.

Furthermore, optionally, the at least one remote device is communicably coupled to a device associated with an end user of the intelligent bolt. In such an instance, the user may utilize the device to access the at least one remote device, in order to control the intelligent bolt. Such a device associated with the end user of the intelligent bolt may also be referred to as a 'user device'. Examples of the device include, but are not limited to, a desktop computer, a laptop computer, a tablet computer, and a smartphone.

In an exemplary implementation, the intelligent bolt is communicably coupled to a server (for example, such as a cloud server) via Internet. In such an implementation, the sensor arrangement of the intelligent bolt is operable to transmit the stress measurement signal to the cloud server. Furthermore, optionally, the sensor arrangement is communicably coupled to the cloud server via network devices such as a router and a concentrator card associated with the router. Therefore, in such an implementation, the sensor arrangement transmits the stress measurement signal to the router, wherefrom the stress measurement signal is transmitted to the cloud server. At the cloud server, the stress measurement signal may be processed, interpreted, visualized, documented, and stored. Consequently, cloud server controls the intelligent bolt. Furthermore, optionally, an end user of the intelligent bolt may utilise a user device (for example, such as a desktop computer, a laptop computer, a smartphone, and the like) for accessing the cloud server to control the intelligent bolt.

In another exemplary implementation, the intelligent bolt is communicably coupled to a Programmable Logic Controller (PLC) unit via a concentrator card. In such an implementation, the sensor arrangement of the intelligent bolt transmits data pertaining to the intelligent bolt to the concentrator card. The concentrator card optionally processes the data pertaining to the intelligent bolt by converting a stress measurement signal to a force measure. Thereafter, the force measure is transmitted to the Programmable Logic Controller (PLC) unit by the concentrator card.

In yet another exemplary implementation, the intelligent bolt is communicably coupled to a plurality of computing devices via a Controller Area Network (CAN) or a Local Interconnected Network (LIN) system. In such an implementation, the intelligent bolt is communicably coupled to the plurality of computing devices via a concentrator card. Therefore, as an example, the sensor arrangement of the intelligent bolt transmits the data pertaining to the intelligent bolt to the concentrator card, wherein such data comprises a stress measurement signal and an operating state of the intelligent bolt. Furthermore, the concentrator card is operable to convert the stress measurement signal into a force measure. Thereafter, the force measure and the operating state of the intelligent bolt are transmitted by the concentrator card to the plurality of computing devices. In one embodiment, the data processing arrangement is configured to receive a measurement signal from the radiation sensor and for energizing the source of interrogating radiation. Furthermore, the data processing arrangement may be provided with wireless communication functionality, for example by employing a low-power microcontroller with an in-built Bluetooth®, LoRa™, LoRaWAN™, or similar wireless communication functionality. The LoRa™ is a two way wireless solution that complements machine-to-machine (M2M) cellular infrastructure. LoRa™ may connect a battery powered mobile device to a network infrastructure. LoRa™ may also connect a battery powered mobile device to a network infrastructure. LoRaWAN™ is a low power wide area network intended for wireless operated things in regional, national and global networks. The network architecture is typically laid out in an end device to a gateway to a network server configuration. LoRa™ is ideal for battery operated sensors such as Internet of Things and M2M.

In one embodiment, a stud bolt is an externally threaded headless fastener. Further, to measure the preload by elongation in the stud bolt is difficult as the elongation depends on the gauge length. For the stud bolt, a gauge length may vary depending on the position of the nut. In this case the sensor and the gauge length are isolated to the unthreaded part of the stud bolt. In that way the gauge length is always the same and the nut position does not affect the elongation.

In an embodiment, the data processing arrangement is configured to process the measurement signal by using differential measurement of light using a first element and a second element. In another embodiment, the data processing arrangement is configured to process the measurement signal by linearization of measurement results using a suitable algorithm, such as, but not limited to, a polynomial algorithm, a spline algorithm, a look-up table conversion.

In one embodiment, the power supply arrangement is configured to provide operating electrical power for the data processing arrangement and the source of interrogating radiation. The power supply arrangement includes at least one of: capacitors (for example super capacitors), non-rechargeable batteries, rechargeable batteries, solar cells (for example, solar film, solar collector, semiconductor photovoltaic solar cells, organic dye solar cells), resonant inductive power coupling arrangements for providing power to the intelligent bolt, a wireless energy charger including a voltage step-up transformer arrangement, or any other energy harvesting arrangements and a combination of these. Optionally, the voltage step-up transformer arrangement is implemented as a resonant piezo-electric (PZT) device, for example fabricated from polarized Lead Zirconate Titanate. The energy harvesting arrangements includes, for example, reception of modulated ambient electromagnetic wireless signals that are intercepted by an antenna to generate a corresponding demodulated signal that is employed to drive a resonant piezo-electric resonant voltage step-up transformer, whose output is rectified to provide operating power to the intelligent bolt, for example at a potential of several volts.

Furthermore, the sensor arrangement may be beneficially mounted within a cradle and encapsulated in a durable protective plastics material that can withstand UV-light exposure, vibration exposure, impact, shock, corrosive substances, moisture and magnetism. In such a manner, the sensor arrangement is beneficially implemented as a unitary part that is practical from a logistics point of view, and easy to install during manufacture, refurbishment and/or repair. Even end users of the intelligent bolt can themselves install the sensor arrangement after receiving modest training.

In an embodiment, the sensor arrangement also includes a target for mounting at the bottom of the bolt cavity; for example, the target is a press fit or adhesively retained at the bottom of the bolt cavity. Furthermore, the sensor arrangement may be operable to interrogate the target when measuring the distance between the head region and the bottom end of the bolt cavity.

In an embodiment, the sensor arrangement is housed within the aforementioned cradle that has an upper portion that is accommodated in the recess and a lower portion that is accommodated within the bolt cavity. The upper portion may be implemented as a planar component with a round peripheral edge. Moreover, the lower portion is disposed with its elongate axis substantially orthogonally to a plane of the upper portion, as illustrated, and joined to the upper portion at substantially a centre of the upper portion. The upper portion and the lower portion of the plastics-materials cradle are beneficially an integral plastics-material moulded component, for example nylon, polyethylene, polypropylene or similar; optionally, PEEK is employed for fabricating the plastics-material cradlefor high-demanded applications. An example of the high-demanded applications include, but not limited to, situations where the intelligent bolt is required to function for a long period at elevated or high temperature, for example 200 degree Celsius (200° C.).

In one embodiment, an upper portion of the plastics-material cradle includes a battery, for example implemented as a round disc-like button cell. Optionally, on an upper exposed surface of the battery, there is mounted a solar film or a solar photovoltaic cell, that is operable to convert sunlight or similar electromagnetic radiation into a charging current for charging the battery, when implemented as a rechargeable battery.

In one embodiment, the sensor arrangement includes a patch antenna surrounding at least a part of the battery for providing for wireless transmission of signals, and optionally wireless transmission of signals. Optionally, the sensor arrangement is encapsulated in a layer of protective plastics material, as aforementioned, for example a substantially optically transparent resin or substantially optically transparent flexible material such as silicone rubber. The silicone rubber is of advantage in that it can be formulated to withstand sustained temperatures approaching 250 degree Celsius (200° C.) over prolonged periods.

In one embodiment, the sensor arrangement is programmed remotely.

In an embodiment, the sensor arrangement also includes a sensor mounted at the end of a circuit board, such as the plastic circuit board, remote from the antenna arrangement. The sensor includes a transmitter to the right of the geometrical axis of the plastics material cradle. The sensor also includes a receiver to the left of the geometrical axis of the plastic material cradle. The plastic material cradle also includes a reference/calibration receiver on the upper side of the transmitter. The reference component, i.e. the reference receiver, is used to measure the transmitted light without a gap to calibrate the sensor with determined time intervals or at every measurement sequence. The plastic circuit board is embedded in the plastics material cradle in such a way that the sensor transmitter and the receiver lies substantially in the bottom surface of the plastic material cradle.

In some embodiments, one or more access holes are provided for coupling electrically to the sensor arrangement, for example for one or more of: for testing purposes, for reprogramming purposes, for sensor arrangement activation purposes.

In one embodiment, a capacitor, for example is implemented as a film super capacitor, is optionally included on a lower face of the battery, namely on an opposite face to an exposed face of the battery onto which the solar film is mounted. Furthermore, the capacitor is capable of providing for surges of power consumption by the intelligent bolt when in operation. For example, the capacitor can provide surges of power consumption when wirelessly transmitting its sensed measurement data when the sensor arrangement is in the "active state". Furthermore, the capacitors may store energy, for example over a relatively longer period, for example days, or even weeks.

In an embodiment, the lower portion of the sensor arrangement includes a data processing arrangement that includes, such as, but not limiting to, a data processing arrangement, a data memory, wireless communication components, and a clock. The data processing arrangement may also include other types of sensors, for example a temperature sensor. The data processing arrangement is optionally implemented as part of a custom-designed application specific integrated circuit (ASIC), or using a standard data processor computer; for example, there is optionally employed a micro-power processor, with in-built BluTooth® functionality, clock functionality, sleep-mode functionality, analog-to-digital (ADC) converter and reference voltage output. The data processing arrangement is beneficially implemented using an elongate printed circuit board whose plane within the sensor arrangement is disposed substantially orthogonally to a plane of the battery, as illustrated. Optionally, the data processing arrangement is not initially provided with software loaded into its data processing arrangement in an initial manufacturing process when the intelligent bolt is produced, and customer-specific software is applied afterwards, for example via the one or more access holes and/or via wireless download of custom-specific software. Optionally, the sensor arrangement is implemented using Silicon Carbide semiconductor electronic components, for enabling the intelligent bolt to function in high-radiation environments, for example in apparatus for decommissioning nuclear reactors, for operating in environments after a nuclear accident has occurred, and similar.

At a distal end of the lower portion of the sensor arrangement, remote from the upper portion, is included a radiation sensor for sensing strain elongation of the intelligent bolt when stress is applied thereto in operation. There is included in the radiation sensor a source of interrogating radiation, for example as described in the foregoing, for example a solid-state laser light source, a LED, an OLED, a plasmon resonance light source or similar. The source of interrogating radiation may be mounted on a first side of a mounting member, for example a circuit board or similar. The radiation sensor, such as a light detector, for example a photo-diode light detector, is included on a second side of the mounting member. The radiation sensor may include two sensor elements, namely a first element for receiving directly a portion of the interrogating radiation emitted from the source of radiation, and a second element for receiving a portion of the interrogating emitted from the source of interrogating radiation that reaches a lower end of the mounting member and is transmitted via a gap "G" formed between the lower end of the mounting member at a bottom end surface of the bolt cavity. As aforementioned, the gap "G" varies as a function of strain experienced in operation by the intelligent bolt, namely as measured using the second element, whereas the directly received portion at the first element provides a measure of light output from the source of interrogating radiation; such two measurements enabling a correction to be applied, for example in the data processing arrangement of the intelligent bolt, to compensate for temporal variations in radiation output from the source of illumination, for example due to ageing of the source of interrogating radiation, or due to changes in its interrogating radiation output as a function of operating temperature of the intelligent bolt.

Furthermore, the gap "G" varies in size when the intelligent bolt is in operation as a function of applied stress to the intelligent bolt. In operation, the upper portion of the sensor arrangement is fixed to the head region of the intelligent bolt, and the distal end of the lower portion is free to move relative to the bottom end surface of the bolt cavity. Furthermore, relative changes in output signal from the first and second elements of the radiation sensor may enable a measure of the gap "G" to be determined, and scaling errors due to changes in light output characteristics of the source of radiation to be determined.

Equation 1 (Eq. 1) defines an approximate relationship between a size of the gap "G" to an output voltage "$V_{E1}$" from the first element and an output voltage "$V_{E2}$" from the second element, wherein "$V_{E0}$" is an offset constant, and k is a scaling constant:

$$G = \frac{k(V_{E2} - V_{E0})}{V_{E1}} \qquad \text{Eq. 1}$$

Equation 2 (Eq. 2) defines an approximate relationship between a size of the gap "G", a stress SA applied to the intelligent bolt and an offset stress "$S_0$":

$$G = \frac{(S_A - S_0)}{E} \qquad \text{Eq. 2}$$

Optionally, the data processing arrangement of the sensor arrangement is operable to apply a linearizing algorithm, for example a polynomial transformation, such as a spline computation, to data corresponding to the signals "$V_{E1}$" and "$V_{E2}$", so that the intelligent bolt generates an accurate representation of the strain applied to the intelligent bolt. Alternatively, or additionally, such linearization is applied at a database to which the intelligent bolt communicates its measurement data in a wireless manner. In an embodiment, the database is present in a computing device such as, a mobile phone, a server, a cloud computing facility and so forth. Beneficially, the intelligent bolt is provided to users in a pre-calibrated state.

In an embodiment, measurement of the gap "G" to a resolution of a few nanometers (nm) has been found feasible to achieve in practical constructed examples of the intelligent bolt.

In one embodiment, the bottom end of the sensor arrangement may be provided with a slidably-coupled loose-fitting cup-shaped target before being introduced into the bolt cavity: the cup-shaped target is either a press fit at the end of the bolt cavity or adhesively secured to the end of the bolt cavity. When pushing the components downwards the laser sensor abuts the bottom of the target. There may be no gap in this condition. The outer wall of the target has an adhesive, for example, and will be fastened in the end of the bolt cavity. Further, it is not critical that the target reaches precisely the bottom end of the cavity. With a preload force on the bolt, the target moves downwards in the cavity and a gap "G" appears. Thus, in an example embodiment of the sensor arrangement, the sensor includes a plastics material cradle (as aforementioned), a printed circuit board (PCB or ASIC) provided with all components to measure the strain, and a target (as aforementioned), that is mounted on the end of the cradle with loose fitting. In one embodiment, the circuit board PCB is moulded into the cradle before it is inserted into the bolt cavity. The PCB may be a flat circuit board with a solid-state laser at a bottom end of an elongate strip, namely providing for the elongate printed circuit board, and the antenna at an end of a strip. Furthermore, different components may be mounted on a longitudinal part of the PCB between the laser and a disc-like part supporting a power supply arrangement, namely the battery. The laser may be configured to measure an elongation of the intelligent bolt. The PCB is flexible, for example fabricated from Kapton (namely nitrile plastics-material film) with one of more layers of electrical conductive tracks embedded therein, and surface-mounting electronic components assembled thereonto, and can be bent to orientate the disc-like part horizontally in an upper, broader part of the plastic cradle. The longitudinal part is oriented vertically, namely orthogonally relative to the disc-like part, in the cradle before the molding. A plastics material with relatively low temperature coefficient of expansion is beneficially chosen to be used, and at least the bottom of the cradle must be optically transparent to allow the laser to emit light from the cradle into the gap "G" beneath the cradle and the target.

Furthermore, the PCB may be moulded into the plastic cradle. Optionally, the PCB is implemented using an application-specific integrated circuit (ASIC). An upper part of the PCB is employed to implement the antenna, and the disc-form center part supports a power supply and the lower part supports the laser radiation source and other components, such as a data processing arrangement, a data memory and a digital clock, as aforementioned. The other components are operable to communicate wirelessly with a remote server or similar, to transfer information of an operating state of the intelligent bolt, for example its pre-load, its strain and optionally operating temperature of the intelligent bolt.

Furthermore, during an exemplary process of molding the PCB into the cradle, the flexible PCB may be bent to orientate its central disc-form region horizontally in the cradle. The antenna is bent around an edge of the battery to expose an end of the antenna to expose it to environs of the intelligent bolt.

In an example embodiment, the plastic cradle has the broader upper portion that is designed to have a close fit within the recess and is fastened thereto using an adhesive material. In one example embodiment, the sensor arrangement is encapsulated in polymeric plastics material, and is secured within the intelligent bolt using adhesive. Moreover, the cradle has the lower portion that has an external diameter that is slightly smaller than an inside diameter of the bolt cavity, for example by at least 0.1 mm smaller, so that the lower portion is capable of moving relative to the inside surface of the bolt cavity as a result of the intelligent bolt being subjected to varying applied stress being in operation along its longitudinal axis.

In one embodiment, the target is formed from a sleeve of a low-friction plastics material, which is slip-fitted, namely slidably coupled, onto the cradle. When the lower portion of the sensor arrangement is inserted into the bolt cavity, it is pushed down until the upper, broader part of the cradle is fitted in a broader part of the bolt cavity. The target is then retained into the bolt cavity by way of there being a friction fit or is adhesively retained.

In one embodiment, the target may be a sleeve of a low friction plastic, which may be slip fitted, namely slidably coupled, onto the cradle, as aforementioned. When the target is inserted into the bolt cavity, it is pushed down using the cradle, until the target is retained at the end of the bolt cavity. The target may be fastened in the bolt cavity by the friction and/or adhesively retained therein.

In an embodiment, the target is placed around and onto the encapsulated sensor of the sensor arrangement. The target has an operating function to reflect incident interrogating radiation received, for example light radiation have a wavelength in a range 190 nm to 3 µm wavelength, back towards to the sensor arrangement. The target is operable to reflect the interrogating radiation in a direct or diffuse manner. Optionally, the target may be fabricated from a plastics material, for example nylon, polyethylene, PEEK, polycarbonate or polypropylene polymers, a glass-filled polymer.

In an embodiment, the plastic target has a function of reflecting light from a laser emitter back to a light receiver arrangement of the sensor arrangement. The target can be either reflecting or diffusing, as aforementioned. Expansion of the target due to temperature changes is optionally compensated in the data processing arrangement of the sensor arrangement. Beneficially, the target is adhesively secured within the bolt cavity, and slides in operation relative to the sensor arrangement when the intelligent bolt is in operation for measuring stress applied longitudinally to the intelligent bolt, by way of strain exhibited by the intelligent bolt.

Optionally, the PCB is implemented as several circuit board modules that are coupled together to form the PCB. Thus, the circuit board modules can be designed to have different functionalities, and the PCB therefore customized during manufacture by choice of circuit board modules to employ.

In operation, the PCB hinders direct transmission from the source of radiation to the light detector, except around a distal end of the PCB via the aforesaid gap "G". Optionally, the source of radiation is provided with a radiation output monitoring arrangement for reference purposes, as aforementioned, for example to compensate for variations in output from the interrogating radiation source as a function of time and/or temperature, The gap "G" varies as the intelligent bolt is strained as a result of longitudinal stress being applied thereto in operation. The target may ensure that the gap "G" is defined in a predicable manner, as the bolt cavity may not necessarily be accurately formed, whereas the target can be injection-moulded to high degree of precision and at a low manufacturing cost.

In a non-pre-load mode of the intelligent bolt, the target may remain in contact with the bottom area of the PCB, such that the gap "G" is substantially zero; in such case, there is transmitted negligible light via the gap "G" from the source of radiation to the light detector. In the pre-load mode of the intelligent bolt, the target may move together with a shank of the intelligent bolt downwards to generate the gap "G"; the intensity of light transmitted via the gap "G" is thus measured to determine the strain in the intelligent bolt, as described in the foregoing.

Furthermore, the length of the "head" of the intelligent bolt can vary considerably, dependent upon its design. In one embodiment, the sensor arrangement must be divided into parts, wherein a first part includes the power supply and antenna, and a second part includes a laser for generating light and a light detector. The first and second parts are mutually connected by a wire arrangement or a connector arrangement.

In operation, the sensor arrangement measures pre-load applied to the intelligent bolt by sending a laser beam from an emitter placed at a distal end of the PCB of the sensor arrangement. The laser beam is then reflected by the target at the bottom of the bolt cavity back towards a receiver mounted in the PCB, which measure the quantity of light that is reflected. When the intelligent bolt is tightened, it elongates elastically and thus the target moves away from the emitter and more light is reflected back via the gap "G" to the receiver. The receiver may register the amount of light as analogue/digital values, which through pre-defined conversion algorithms is translated to provide data representative of a force in Newton (N). The conversion algorithms can be obtained through reference load cells, calculations, stress mechanics, VDI 2230 calculation method or displacement test benches.

In an embodiment, data and information such as, for example, pre-load, temperature, time, position of the intelligent bolt, ID reference of the intelligent bolt, intelligent bolt type, battery status, intelligent bolt status, inspection interval and similar are wirelessly sent to an access point which connects to a database via, for example GSM, Wi-Fi, Internet TCP/IP or other communication network and uploads measurement and/or status data/information. The database may be a present in a computing device located remotely from the intelligent bolt. The wireless communication in the intelligent bolt may be Bluetooth®, LoRa®, Zigbee®, Z-Wave® or other similar. The position of the intelligent bolt can be determined by its position within a peer-to-peer (P2P) network, when wireless communication from a given intelligent bolt is relayed via other intelligent bolts that are operable to define the peer-to-peer (P2P) network. In other words, the intelligent bolt is optionally capable of functioning as a wireless peer-to-peer communication node as well as providing its stress-measuring functionality, as well as optionally temperature sensing functionality.

In one example embodiment, the intelligent bolt is arranged to be operable in an aquatic environment, as described in the foregoing, and to transmit its processed measurement signal via a conductive communication path external to the intelligent bolt using capacitive coupling of its processed measurement signal from the sensor arrangement to the conductive communication path. For example, the intelligent bolts can be used in pipelines under the water, and the intelligent bolts can transmit processed measurement signal via a conductive communication path external to the intelligent bolt via capacitive coupling of its processed measurement signal from the sensor arrangement to the conductive communication path.

In one embodiment, the sensor arrangement is encapsulated in polymeric plastics material, and is secured within the intelligent bolt using adhesive.

In another embodiment, the sensor arrangement may be mountable in a bolt cavity of an intelligent bolt including a head region coupled to a threaded region; optionally, the threaded region extends substantially to the head region. A distance between the head region and a bottom end of the bolt cavity may change in operation as a function of longitudinal stress applied between the threaded region and the head region. Furthermore, the sensor arrangement may be configured to measure changes in the distance between the head region and the bottom end of the bolt cavity.

In one embodiment, the sensor arrangement is mountable in the head region such that the sensor arrangement is spatially referenced in respect of the head region. In another embodiment, a sensor arrangement is mountable so that the distal end of the sensor arrangement is disposed adjacent to the bottom end of the bolt cavity such that changes in spatial position of the bottom end of the bolt cavity relative to the distal end of the sensor arrangement occur as a function of changes in longitudinal stress applied to the intelligent bolt to define a gap "G" whose size varies according to the changes in the longitudinal stress. The sensor arrangement may be operable to provide for interrogating radiation transmission in operation via the gap "G" from a source of interrogating radiation of the sensor arrangement to a corresponding radiation sensor of the sensor arrangement to generate a stress measurement signal from the radiation sensor that is processable within the sensor arrangement for wireless communication from the intelligent bolt.

In one embodiment, the sensor arrangement is operable to implement wireless communication of the processed stress measurement signal is implemented in a peer-to-peer (P2P) manner, and that the sensor arrangement is operable to function as a peer-to-peer (P2P) communication node for relaying peer-to-peer transmissions. For example, the sensor arrangement may communicate with other intelligent bolts present within a pre-defined range and can communicate measurement signal and data with other intelligent bolts. In an alternative embodiment, the sensor arrangement may be operable to communicate the measurement signal or data to other computing devices wirelessly.

In an embodiment, the sensor arrangement includes one or more components. The sensor arrangement includes a power supply arrangement and a data processing arrangement. In some embodiments, the sensor arrangement includes the power supply arrangement including a battery for example a non-rechargeable battery, such as a Lithium battery. In another embodiment, the power supply arrangement includes a power harvesting arrangement for harvesting or producing energy from an external environment to the intelligent bolt. The power harvesting arrangement may include at least one of a solar collector, a resonant inductive charger, a wireless energy charger including a voltage step-up transforming arrangement. In yet another embodiment, the power supply arrangement includes one or more capacitors, super-capacitors or similar.

Furthermore, the data processing arrangement may be provided in operation with power from the power supply arrangement. Furthermore, the data processing arrangement is operable to function in at least a "sleep state" and an "active state". In an alternative embodiment, the data processing arrangement is configured to conserve power when in the "sleep" state by ceasing sending wireless transmissions, for example, measurement data, from the intelligent bolt.

Further, all the aforesaid components of the sensor arrangement may be placed in a supporting cradle and moulded into a durable protective plastic that can withstand, ultraviolet light, vibration, impact, shock, corrosive substances, moisture, and magnetism.

In an embodiment, the sensor arrangement of the intelligent bolt is beneficially implemented to provide a higher degree of measurement functionality than has previously been feasible for known types of intelligent bolts. For example, the intelligent bolt is beneficially implemented such that its sensor arrangement includes a wireless transmitter to transmit measurement data from the intelligent bolt, for example at temporal intervals, for example at pre-defined temporal intervals. In an embodiment, the sensor arrangement is operable to switch between the "sleep state" and the "active state" in a cyclical manner, to provide a temporal sequence of stress measurement data that may be transmitted wirelessly from the intelligent bolt. In some embodiments, the stress measurement data is transmitted to a remotely located computing device. For example, the sensor arrangement is operable to function in at least two states, namely a "sleep state" and "an active state" as aforementioned. In the "sleep state", power consumption of the sensor arrangement may get reduced to a low level, for example in a range of 1 to 1000 microwatts ($\mu W$); moreover, the sensor arrangement is inactive and may not wirelessly transmit measurement data from the sensor arrangement. In the "active state", the sensor arrangement may perform measurements and/or transmits measurement data from the sensor arrangement.

Furthermore, the intelligent bolt, when in operation, is mostly in the "sleep state", but occasionally may switch from the "sleep state" to the "active state" to make measurements and/or to transmit measurement data, as aforementioned. Optionally, the intelligent bolt is in the "active state" for a period of only 1% or less of its operating time, and is in the "sleep state" for 99% or more of its operating time. Yet more optionally, the intelligent bolt is in the "active state" for a period of only 0.1% or less of its operating time, and is in the "sleep state" for 99.9% or more of its operating time. In an embodiment, the sensor arrangement is in an initial "dormant state", and is switchable for use into the "sleep state" and/or the "active state". Optionally, the intelligent bolt, prior to installation to fasten parts together, is in a "dormant state", wherein the intelligent bolt does not periodically switch from its "sleep state" to its "active state" and back again, in a periodic cyclical manner; for example, the intelligent bolt is in its "dormant state" when in storage, and is then subsequently activated to commence its routine of switching between its "sleep state" and its "active state" as aforementioned when used to fasten parts together with pre-load applied to the intelligent bolt. Optionally, the intelligent bolt is switched from its "dormant state" by applying a wireless signal thereto, a magnetic pulse thereto, or similar. For example, the intelligent bolt optionally includes a miniature magnetic sensor, for example a Hall-effect switch or a reed switch that is used to switch the intelligent bolt from its "dormant state" into its "sleep state" or "active state".

In an embodiment, the sensor arrangement while being in the "sleep state" consumes less than one percent of power consumed by the sensor arrangement in the "active state". In another embodiment, the sensor arrangement while being in the "sleep state" consumes less than 0.1% of power consumed by the sensor arrangement in the "active state".

In an embodiment, the sensor arrangement is operable to be temporally more than 99% of its operating time in the "sleep state", relative to the "active state".

Optionally, when in the "active state", the sensor arrangement may perform a number of temporal measurements to provide a set of corresponding measurement data in data memory of the intelligent bolt, and then transmits the corresponding measurement data of the plurality of measurements in one message together with corresponding temporal data indicative of when, namely using time markers, the plurality of measurements were made. Alternatively, or additionally, in the "active state", the sensor arrangement may perform a single measurement to provide a corresponding measurement data in data memory of the smart unit, and then transmits the corresponding measurement data of the single measurement in one message together with corresponding temporal data indicative of when the single measurement was made. Optionally, the intelligent bolt can be reconfigured in operation and/or when initially activated from its "dormant state", to perform either single measurement or a plurality of measurements, as described in the foregoing. Alternatively, the intelligent bolt is supplied in an already operational condition, namely switching between its "sleep state" and "active state".

In an embodiment, the intelligent bolt of the present disclosure further includes a digital clock for defining a period between repetitions of the "active state" being employed. The digital clock can also be configured to provide time coordination for measurement.

The intelligent bolt, pursuant to the present disclosure, is capable of providing automatic inspection and reporting of its operating status, in particular a measurement of the pre-load of the intelligent bolt. Optionally, the intelligent bolt is also operable to report a status of its internal battery, for example a non-rechargeable battery, such as a Lithium battery, for example for reporting a degree to which the non-rechargeable battery has been exhausted, so that a routine to replace the intelligent bolt can be devised by its users. By such an approach, loosening or potential failure, due to corrosion and/or fracture of the intelligent bolt, can be monitored remotely. Optionally, additional sensing functionality can be provided in the intelligent bolt, for example a temperature measurement of the intelligent bolt, performed when its pre-load is also being measured; temperature sensing is beneficially performed using a temperature sensor that its accommodated within the sensor arrangement, for example by using a solid state temperature sensor. The intelligent bolt is susceptible to being used for bolted joints in situations, for example, including: railway switches or track junctions, airfield runway lights, oil rig structures/facilities, power stations, marine craft, bridges, storage tanks, and so forth.

In an exemplary scenario, airfield runway lights in an airport are bolted using bolts to a given runway and the bolts must be checked and verified on a regular basis to check for loosening of bolts. If a given light becomes disconnected from the runaway due to its bolts becoming loose, it may result in an airplane crash. The lights are conventionally inspected by employing a torque-check according to a rigorous schedule. During an inspection time associated with such torque-checking, the runway must be closed and no airplanes can take off or land. It is estimated that an annual cost of checking bolts on runway lights is approximately 500 k£/year (approximately 1 million USD, 2016 exchange rate) and, in addition, there is a cost of down-time for a closed runway, which may be in a range to two to four hours per night. By using the intelligent bolt for securing such lights, all the lights can be remotely inspected and reported automatically with no staff presence required on the runway, and also without a need to close the runway whilst inspections are being performed. Thus, there are provided benefits of cost savings for inspection and reporting, more runway time available for more flight slots and increased safety as the intelligent bolt provides quantifiable results for pre-load.

The present disclosure also provides a method of using an intelligent bolt including a head region coupled to a threaded region. The head region includes a bolt cavity. Furthermore, a distance between the head region and a bottom end of the bolt cavity changes in operation as a function of longitudinal stress applied between the threaded region and the head region. The intelligent bolt also includes a sensor arrangement for measuring changes in the distance between the head region and the bottom end of the bolt cavity. The disclosed method includes arranging for the sensor arrangement to be mounted in the head region such that the sensor arrangement is spatially referenced in respect of the head region. The method further includes arranging for a distal end of the sensor arrangement to be disposed adjacent to the bottom end of the bolt cavity such that changes in spatial position of the bottom end of the bolt cavity relative to the distal end of the sensor arrangement occur as a function of changes in longitudinal stress applied to the intelligent bolt to define a gap "G" whose size varies according to the changes in the longitudinal stress, wherein interrogating radiation transmission in operation via the gap "G" from a source of interrogating radiation of the sensor arrangement to a corresponding radiation sensor of the sensor arrangement generates a stress measurement signal from the radiation sensor that is processed within the sensor arrangement for wireless communication from the intelligent bolt.

The disclosed intelligent bolt provides a higher degree of measurement functionality than has previously been feasible for known types of intelligent bolts. For example, the intelligent bolt is beneficially implemented such that its sensor arrangement includes a wireless transmitter to transmit measurement data from the intelligent bolt, for example at temporal intervals.

Furthermore, the intelligent bolt is capable of providing automatic inspection and reporting of its operating status, in particular a measurement of the pre-load of the intelligent bolt. The intelligent bolt is also operable to report a status of its internal battery. By such an approach, loosening or potential failure, due to corrosion and/or fracture of the intelligent bolt, can be monitored remotely. Furthermore, additional sensing functionality such as, but not limited to, temperature measurement may be provided in the intelligent bolt.

Furthermore, the present disclosure relates to a computer program product comprising a non-transitory computer-readable storage medium having computer-readable instructions stored thereon, the computer-readable instructions being executable by a computerized device comprising processing hardware to execute at least one of the aforementioned methods.

The present disclosure provides intelligent bolts, namely a form of smart fasteners, that are susceptible to being used in oil and gas industries, in construction industries, in marine environments, in power generation industries, in renewable energy industries, in nuclear industries, in railway systems, in forestry, in agriculture, in heavy Infrastructure industries, in aerospace industries. Additionally, the intelligent bolts are susceptible to being used, for example, in bolted connections which are either subject to regular inspection or those that are critical for safety or functionality of an application or structure.

DETAILED DESCRIPTION OF THE DRAWINGS

Referring to FIG. 1, there is provided a schematic illustration of an intelligent bolt 10, in accordance with an embodiment of the present disclosure. As shown, the intelligent bolt 10 includes a head region 40 coupled to a threaded region 20, for example optionally via an unthreaded neck region. The head region 40 includes a bolt cavity 60. The intelligent bolt 10 is arranged to employ a sensor arrangement implemented as a single unit that is operable to interrogate the bolt cavity 60 that is pre-formed into the intelligent bolt 10. The intelligent bolt 10 is capable of providing automatic inspection and reporting of its operating status, in particular a measurement of the pre-load of the intelligent bolt 10. In the head region 40, there is provided a recess 50 for accommodating the aforementioned sensor unit. Moreover, the bolt cavity 60 extends from a bottom of the recess 50 to approximately a middle of the threaded region 20, for example the middle of the intelligent bolt 10 is in a range of 20% to 70% along a length of the intelligent bolt 10. As shown, the bolt cavity 60 is disposed along a central elongate axis of the intelligent bolt 10, but need to necessarily be so; for example, the bolt cavity 60 is optionally off-axis, rather than being on-axis as illustrated in FIG. 1. Optionally, the intelligent bolt 10 is provided with a plurality of bolt cavities 60, each provided with a sensor arrangement, for example for measuring asymmetrical load applied to the intelligent bolt 10 when in operation.

Figure 2:
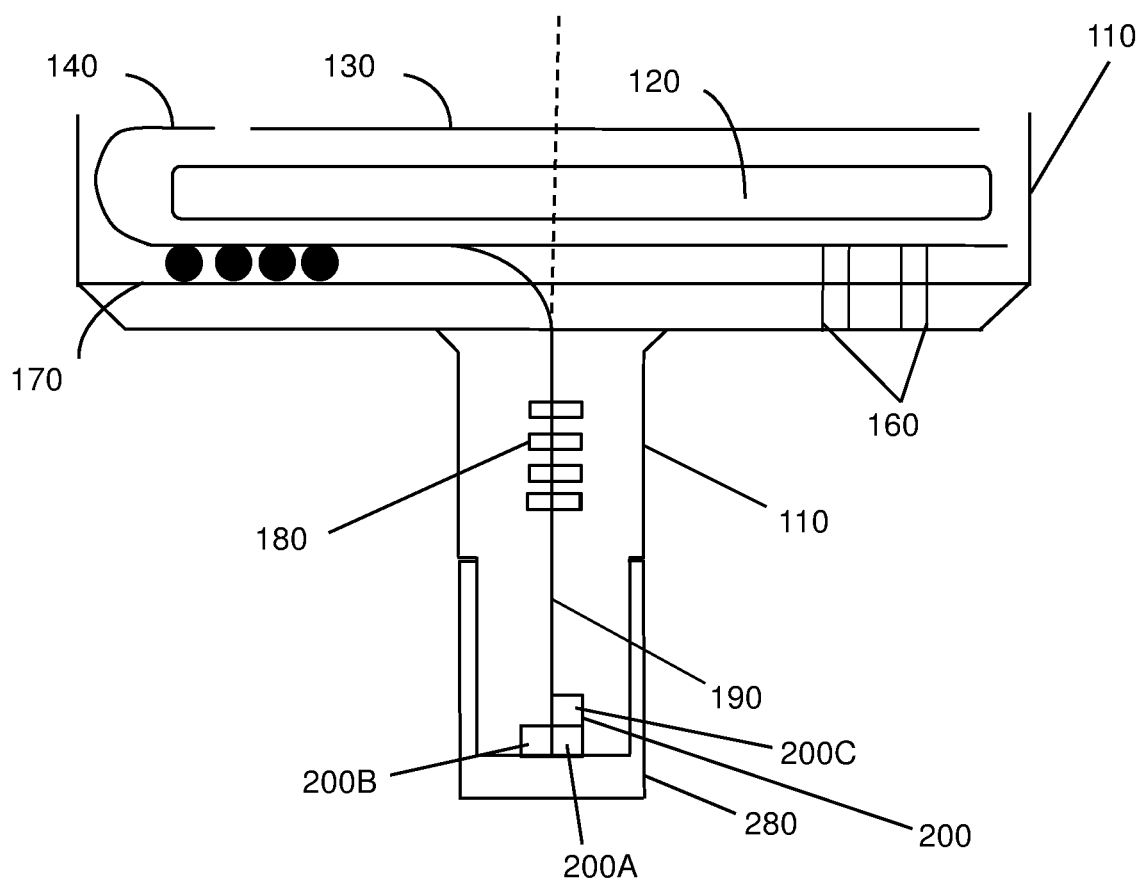
FIG. 2 is an illustration of a sensor arrangement of an intelligent bolt, in accordance with an embodiment of the present disclosure.

Referring next to FIG. 2, the intelligent bolt 10 further includes a sensor arrangement 100 mounted in the head region 40 such that the sensor arrangement 100 is spatially referenced in respect of the head region 40. The sensor arrangement 100 is housed within a plastics-material cradle 110 that has an upper portion that is accommodated in the recess 50 as discussed with reference to FIG. 1, and a lower portion that is accommodated within the bolt cavity 60.

The sensor arrangement 100 can be installed into the bolt cavity 60 formed inside, for example, standard mass-produced types of bolts/screws or stud bolts. The sensor arrangement 100 includes a source of interrogating radiation 200A for illuminating the bottom end of the bolt cavity 60. The sensor arrangement 100 also includes a radiation sensor 200B for receiving radiation returned from the bottom end of the bolt cavity 60 for measuring an elongation of the intelligent bolt 10. The sensor arrangement 100 also includes a data processing arrangement 180 for receiving a measurement signal from the radiation sensor 200B and for energizing the source of interrogating radiation 200A.

As shown, the sensor arrangement 100 also includes a power source arrangement for providing operating electrical power for the data processing arrangement 180 and the source of interrogating radiation 200A. The power source arrangement includes capacitors 170, one or more batteries 120, and a solar collector 130 for providing power to the intelligent bolt 10. As shown, the upper portion of the plastics-material cradle 110 includes the batteries 120. Furthermore, on an upper exposed surface of the batteries 120, there is mounted the solar collector such as a solar film 130, that is operable to convert sunlight or similar electromagnetic radiation into a charging current for charging the batteries 120, when implemented as a rechargeable battery. The capacitors 170, for example implemented as a film super capacitor, is optionally included on a lower face of the batteries 120, namely on an opposite face to an exposed face of the batteries 120 onto which the solar collector 130 is mounted. The capacitors 170 are capable of providing for surges of power consumption by the intelligent bolt 10 when in operation, namely when operating in its "active state".

The sensor arrangement 100 also includes an antenna arrangement 140 surrounding at least a part of the batteries 120 for providing for wireless transmission of signals, and optionally wireless transmission of signals. Furthermore, the sensor arrangement 100 is encapsulated in a layer of protective plastics material such as the plastic material cradle 110.

Furthermore, the sensor arrangement 100 includes one or more access holes 160 for coupling electrically to the sensor arrangement 100, for example for one or more of: for testing purposes, for reprogramming purposes, for activation of the sensor arrangement 100, and so forth.

The data processing arrangement 180 may be implemented using an elongate printed circuit board 190 whose plane within the sensor arrangement 100 is disposed substantially orthogonally to a plane of the batteries 120, as illustrated. By "substantially orthogonal" is meant, for example, in a range of 85° to 95°.

The sensor arrangement 100 also includes a sensor 200 mounted at the end of a circuit board, such as the printed circuit board 190, remote from the antenna arrangement 140. The sensor 200 includes a transmitter 200A to the right of the geometrical axis of the plastics material cradle 110. The sensor 200 also includes a receiver 200B to the left of the geometrical axis of the plastic material cradle 110. The plastic material cradle 110 also includes a reference/calibration receiver 200C on the upper side of the transmitter 200A. The reference component, i.e. the reference receiver 200C, is used to measure the transmitted light without a gap to calibrate the sensor 200 with determined time intervals or at every measurement sequence. The printed circuit board 190 is embedded in the plastic material cradle 110 in such a way that the sensor transmitter 200A and the receiver 200B lies in the bottom surface of the plastic material cradle 110.

Figure 3:
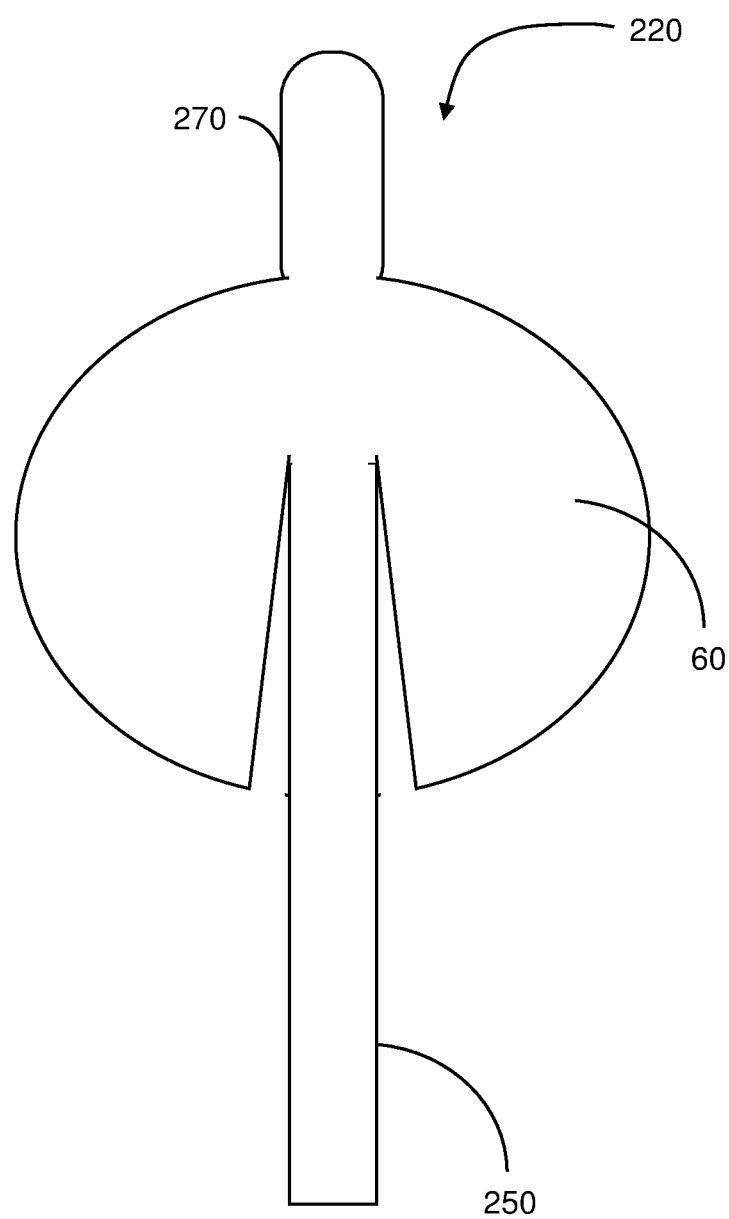
FIG. 3 is an illustration of a printed circuit board before insertion in a cradle, in accordance with an embodiment of the present disclosure.

FIG. 3 is an illustration of a circuit board 220 before insertion in a plastics material cradle 110, in accordance with an embodiment of the present disclosure. The circuit board 220 is shown in a condition before it is moulded into the plastics material cradle 110. In one embodiment, the circuit board 220 is a printed circuit board 220. In another embodiment, the circuit board 220 is a bonded circuit board. In yet another embodiment, the circuit board 220 is an application-specific integrated circuit (ASIC) board.

Figure 4:
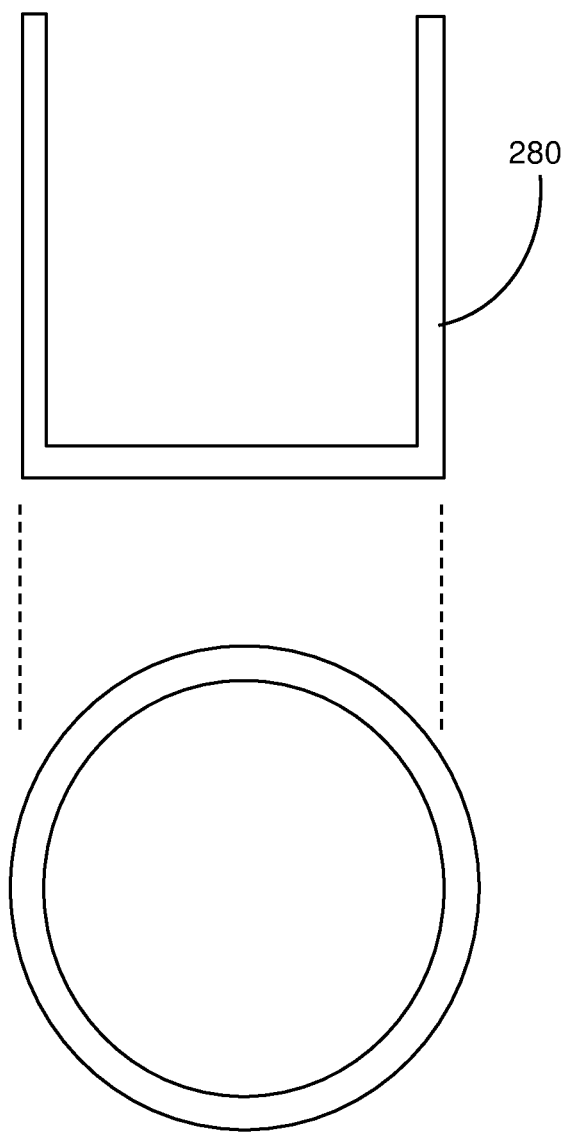
FIG. 4 shows a side view of a target, for slidably inserting over and end of a cradle, in accordance with an embodiment of the present disclosure.

Referring now to FIG. 4, a side view of a target 280 is shown. The target 280 is placed around and onto the radiation sensor 200 of the sensor arrangement 100. As discussed with reference to FIG. 2, the radiation sensor 200 includes or the target 280, for example implemented as a plastics material sleeve, and the circuit board 220 provided with all components to measure the strain, wherein the target 280 is slidably retained on the cradle by way of being a loose fitting thereonto. The target 280 is secured at a bottom of the bolt cavity 60.

Referring now to FIG. 3, the circuit board 220 is moulded into the cradle 110. The circuit board 220 is shown flat with a solid-state laser at a bottom end of an elongate strip 250, namely providing for the elongate circuit board 220, and the antenna arrangement 140 at an end of a strip 270.

Figure 5:
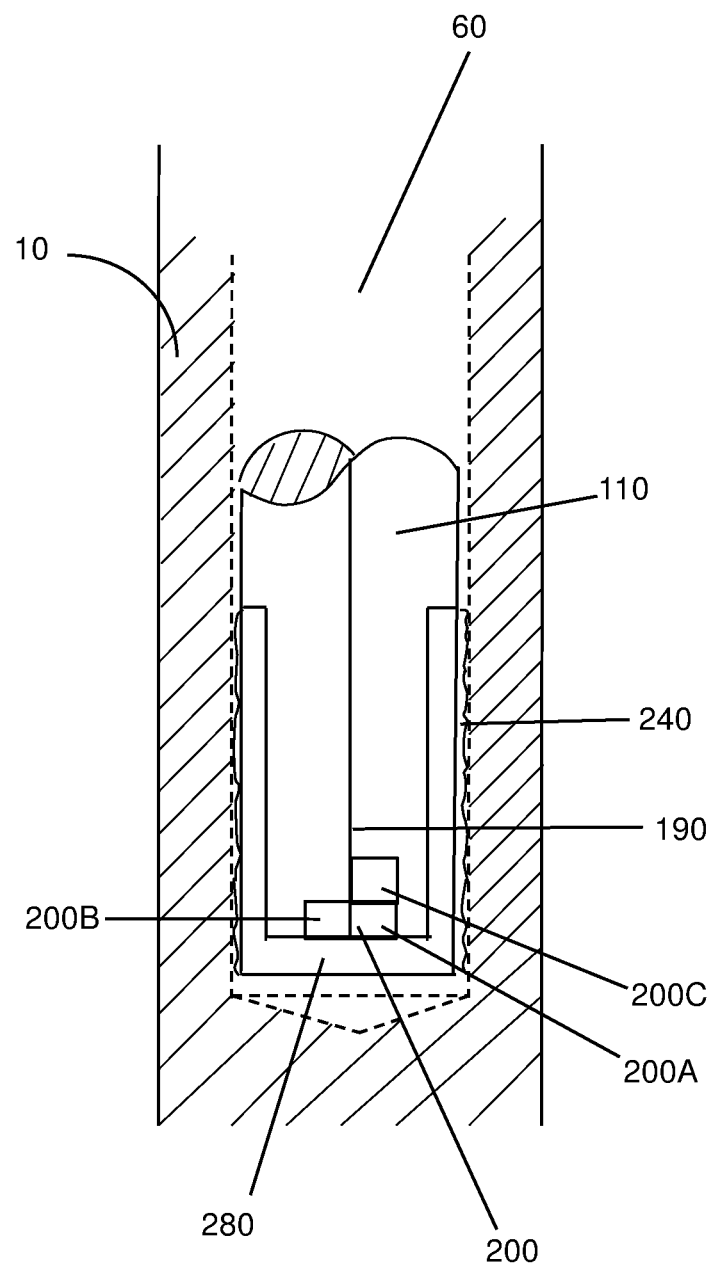
FIGS. 5 and 6 illustrate operation of an intelligent bolt, in accordance with an embodiment of the present disclosure.
Figure 6:
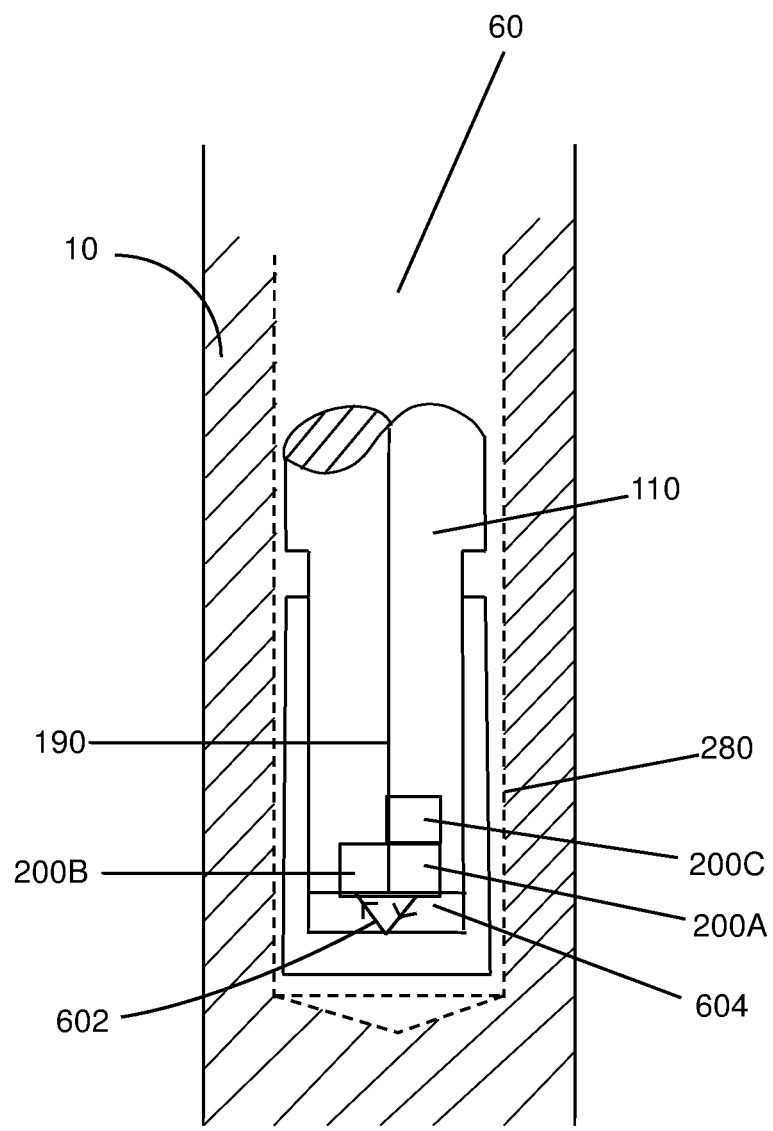

Referring next to FIG. 5 and FIG. 6, there is illustrated operation of the sensor arrangement 100. As discussed with reference to FIG. 2, the PCB 190 hinders direct transmission from the source of interrogating radiation 200A to the radiation sensor 200B. The gap 604 varies as the intelligent bolt 10 is strained as a result of longitudinal stress being applied thereto in operation. The target 280, in cooperation with the cradle 110, may ensure that the gap 604 is defined in a predicable manner, as the bolt cavity 60 may not necessarily be accurately formed, whereas the target 280 can be injection-moulded to high degree of precision and at a low manufacturing cost.

In FIG. 5, there is shown a situation in a non-pre-load mode, wherein the target 280 is in contact with the bottom area of the PCB 190, such that the gap 604 is substantially zero; in such case, there is transmitted negligible light via the gap "G" from the source of interrogating radiation 200A to the radiation sensor 200B. The sensor arrangement 100 may be encapsulated in polymeric plastics material, and is secured within the intelligent bolt using an adhesive. The target 280 has a close fit to the bolt cavity 60 and may be optionally fastened by using an adhesive 240.

In FIG. 6, the intelligent bolt 10 is in a pre-load mode. The target 280 may move together with a shank of the intelligent bolt 10 to generate a gap "G" 604, the intensity of a light beam 602 transmitted via the gap 604 is measured to determine the strain in the intelligent bolt 10.

Figure 7:
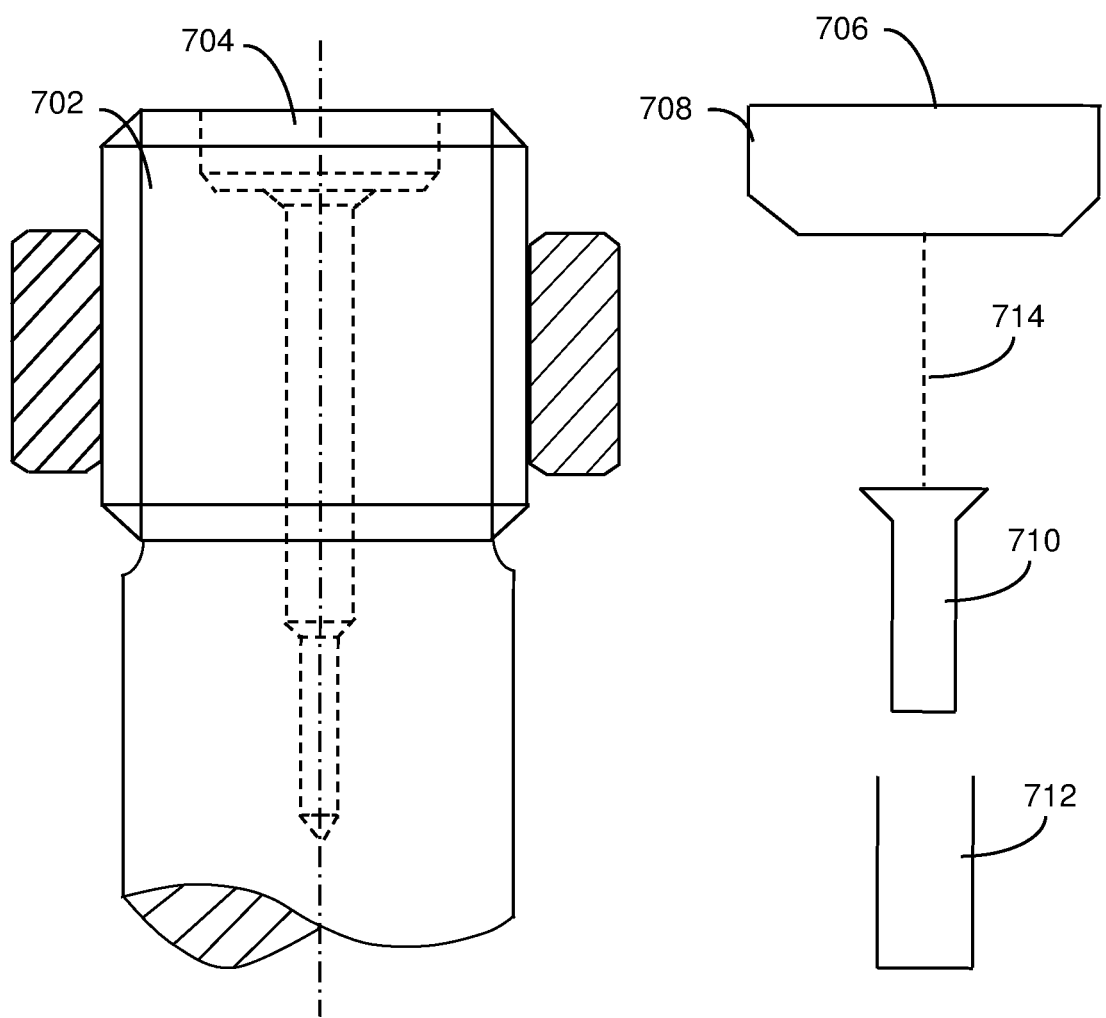
FIG. 7 is an illustration of an intelligent bolt and different parts of a sensor arrangement of the intelligent bolt, in accordance with an embodiment of the present disclosure.

FIG. 7 is an illustration of a stud bolt 702 (also referred as a stud intelligent bolt) and different parts of a sensor arrangement 704 of the stud bolt 702, in accordance with an embodiment of the present disclosure. The sensor arrangement 100 can be divided into two parts: a first part includes the power supply 706 and an antenna arrangement 708, and a second part includes a laser 710 and a cradle 712. Furthermore, the first and second parts are mutually connected by a wire arrangement or a connector arrangement 714. The stud bolt 702 is an externally threaded headless fastener. Further, to measure the preload by elongation in the stud bolt 702 is difficult as the elongation depends on a gauge length. For the stud bolt 702, a gauge length may vary depending on a position of the nut. In this case the sensor and the gauge length are isolated to an unthreaded part of the stud bolt 702. In that way the gauge length is always the same and the nut position may not affect the elongation.

Figure 8:
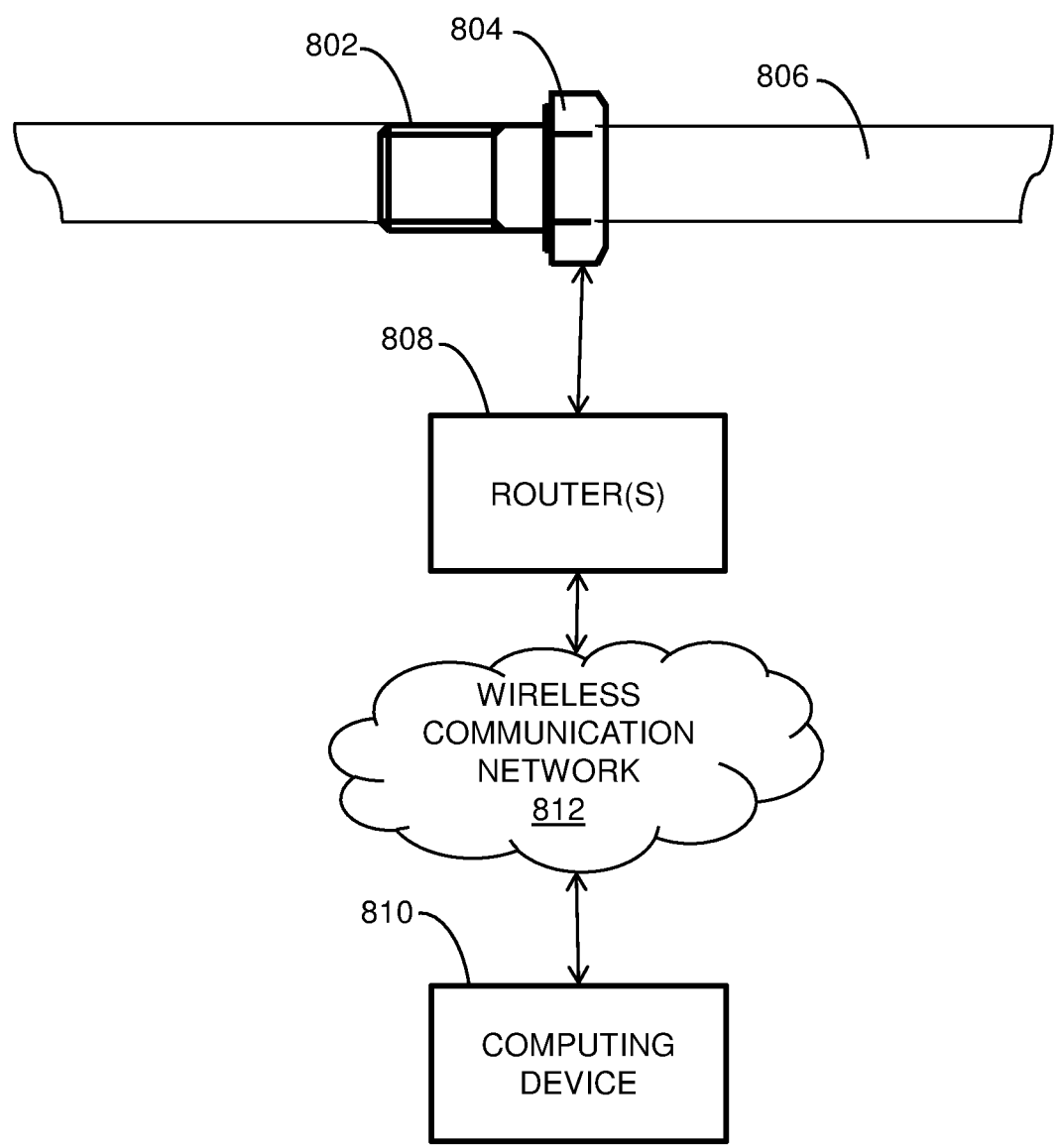
FIG. 8 is an exemplary communication system including one or more routers arranged spatially nearby a bolt assembly, according to an embodiment of the present disclosure.

FIG. 8 is an exemplary communication system 800 including one or more routers 808 arranged nearby a bolt assembly 802, according to an embodiment of the present disclosure. As shown, the communication system 800 includes the bolt assembly 802 including an intelligent bolt 804 being used for bolted joints in a pipeline 806. The intelligent bolt 804 may be configured to process the stress measurement signal to generate corresponding measurement data and to transmit the measurement data wirelessly to one or more routers located nearby to the intelligent bolt 804 when in the active state.

Data and information such as, for example, pre-load, temperature, time, position of the intelligent bolt 804, ID reference of the intelligent bolt 804, intelligent bolt type, battery status, intelligent bolt status, inspection interval and similar are wirelessly sent to a computing device 810 via the routers 808 connected through a wireless communication network 812. In one embodiment, the routers 808 transmit information to a cloud server including the computing device 810.

Figure 9:
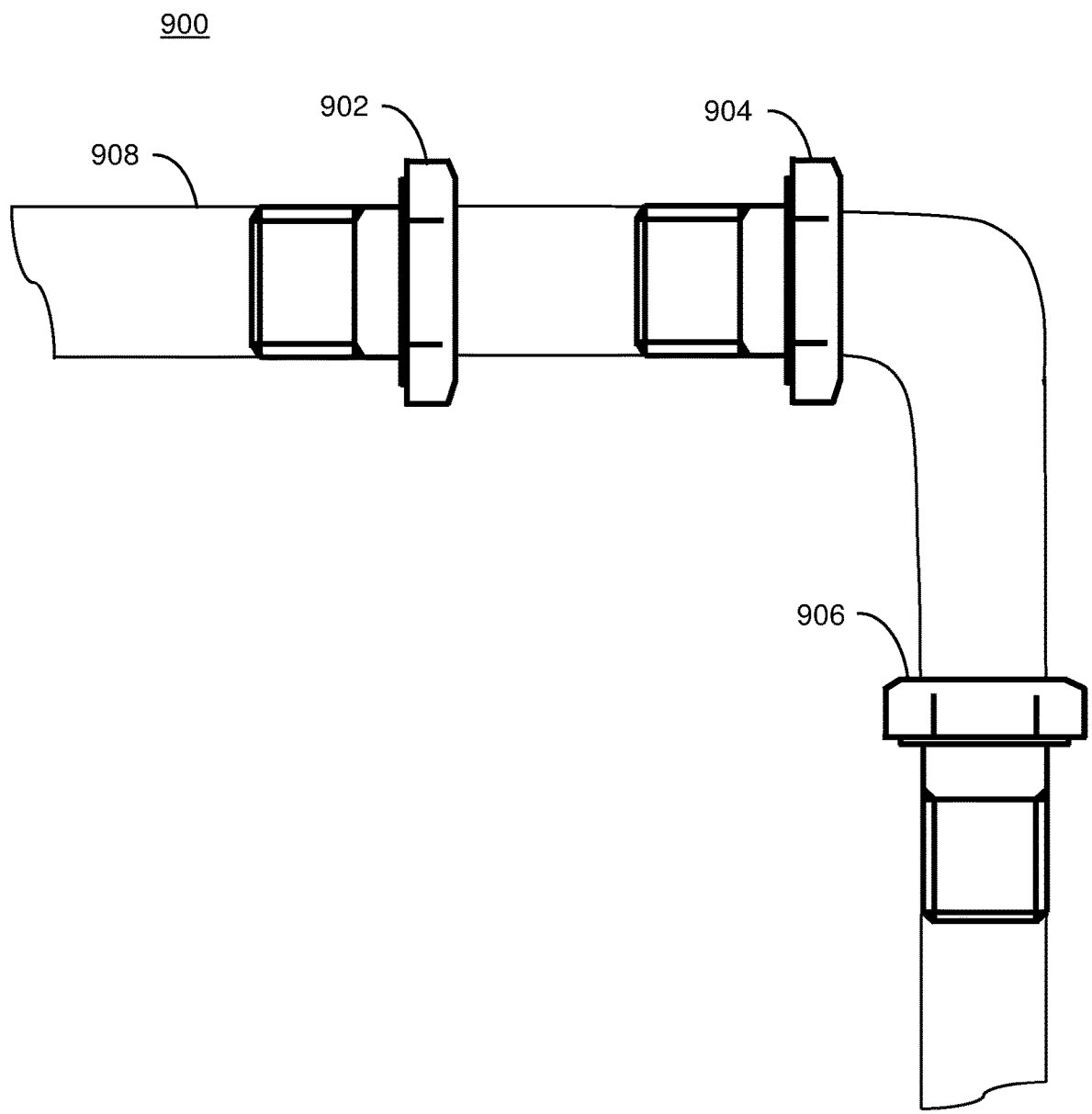
FIG. 9 is an exemplary environment where another embodiment of the present disclosure is operable to function.

FIG. 9 is an illustration of an exemplary environment 900 where another embodiment of the present disclosure can function. As shown, the environment includes a number of intelligent bolts 902, 904, and 906 used in bolted joints in a pipeline 908. The intelligent bolts 902, 904, and 906 are mounted spatially mutually adjacently on the pipeline 908. The intelligent bolts 902, 904, and 906 are operable to transmit their sensed measurement data from one intelligent bolt to another intelligent bolt in a peer-to-peer ("P2P") form of communication. Furthermore, the intelligent bolt 902 may be configured to transmit data to the intelligent bolt 906 directly or indirectly via the intelligent bolt 904. Alternatively, the intelligent bolts 902, 904, and 906 may transmit their data wirelessly in a communication channel that common thereto; optionally, in an event that two or more of the intelligent bolts 902, 904, and 906 transmit their sensed measurement data simultaneously, such simultaneous transmission is detected and one or more further attempts to retransmit the sensed measurement data are then made after a waiting period.

Figure 10:
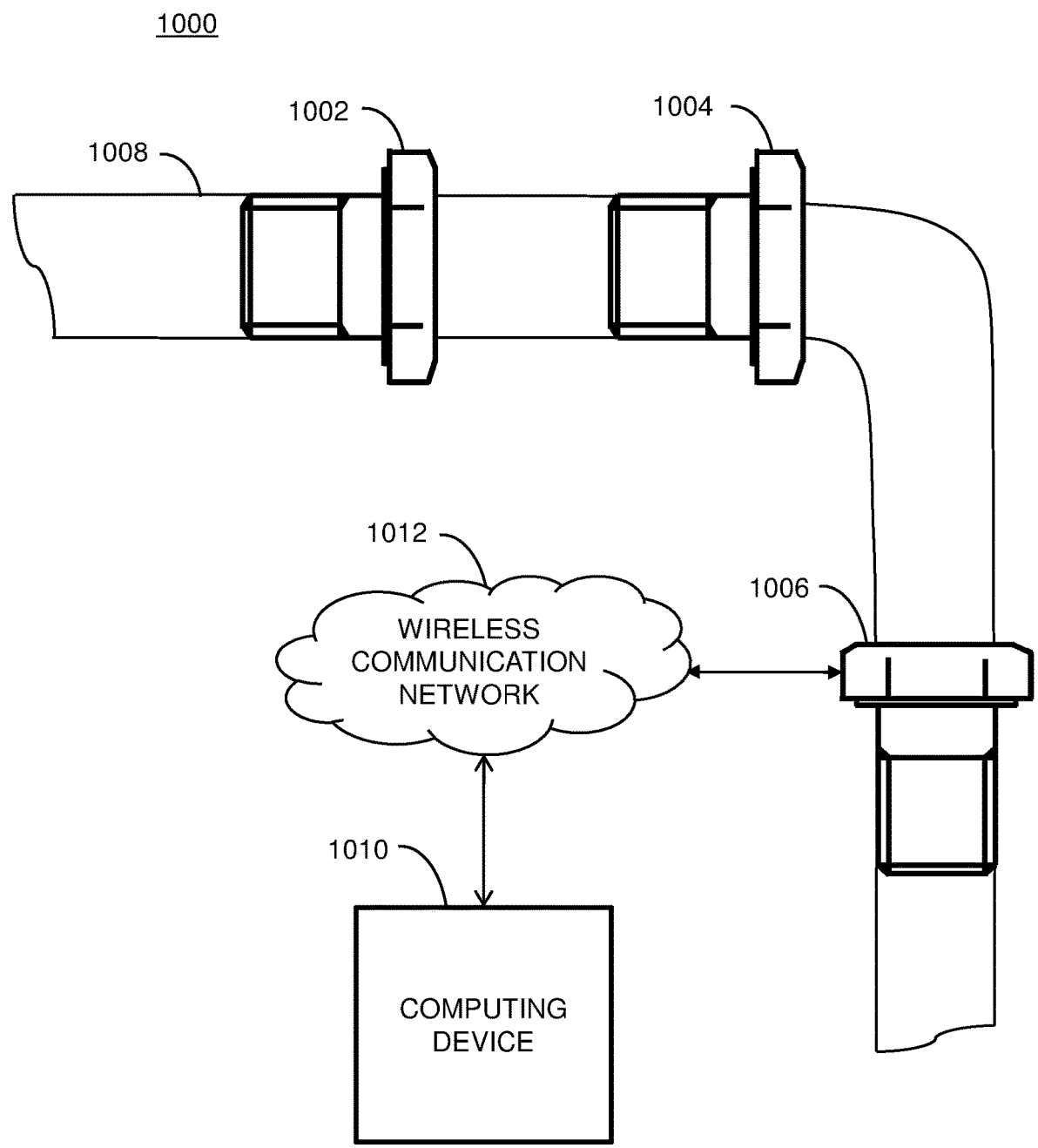
FIG. 10 is an exemplary environment where yet another embodiment of the present disclosure is operable to function.

FIG. 10 is an illustration of an exemplary environment 1000 where yet another embodiment of the present disclosure can function. As shown, the environment 1000 includes a number of intelligent bolts 1002, 1004, and 1006 used in a number of bolted joints in a pipeline 1008. The intelligent bolts 1002, 1004, and 1006 are mounted spatially mutually adjacently, the intelligent bolts 1002, 1004, and 1006 are operable to transmit their sensed measurement data from one intelligent bolt to another in a peer-to-peer ("P2P") form of communication. Furthermore, each of the intelligent bolts 1002-1006 is configured to wirelessly send data to a computing device 1010 via a wireless communication network 1012. As shown, the intelligent bolt 1006 can transmit or relay the data received from other intelligent bolts such as, the intelligent bolt 1002 to a receiver such as, the computing device 1010 via the wireless communication network 1012 for further processing.

Figure 11:
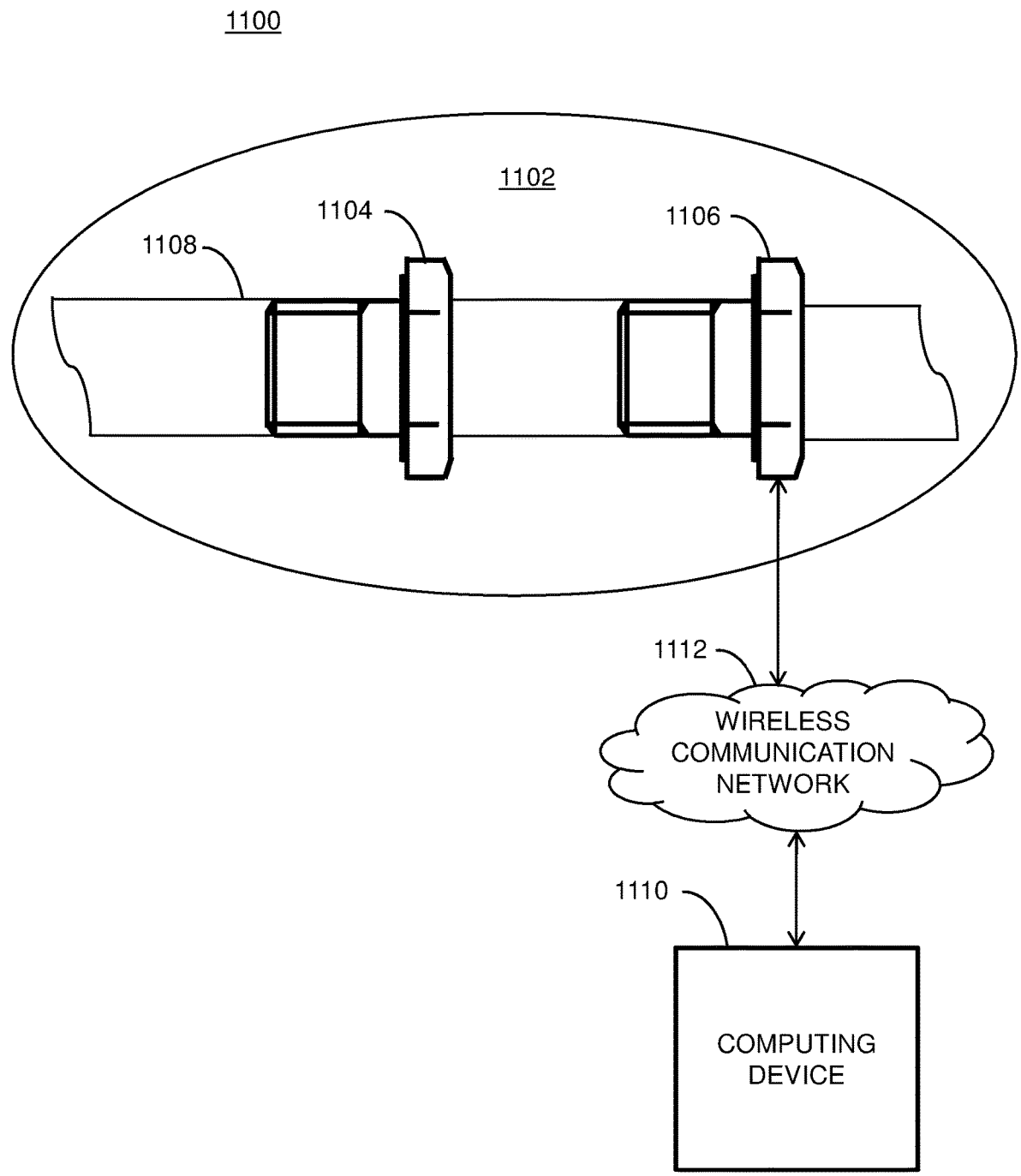
FIG. 11 is an exemplary environment where a further another embodiment of the present disclosure is operable to function.

FIG. 11 is an illustration of exemplary environment 1100, wherein another embodiment of the present disclosure can function. As shown, the environment includes two intelligent bolts 1104 to 1106 arranged to be operable in an aquatic environment 1102, and to transmit its processed measurement signal via a conductive communication path external to the intelligent bolts 1104 to 1106 using capacitive coupling of its processed measurement signal from sensor arrangements of the intelligent bolts 1104 to 1106 to the conductive communication path. The intelligent bolts 1104 to 1106 are used in a pipeline 1108 under the water, for example in a saline condition, and the intelligent bolts 1104 to 1106 can transmit processed measurement signal to a computing device 1110 via a wireless communication network 1112. The aforementioned aquatic environment 1102 is, for example, an ocean-floor environment with saline sea water under very high pressures, for example in a range of 300 to 1000 Bar; ocean-floor environments are encountered, for example, for executing deep-sea oil and gas exploration and production.

As described in the foregoing, the present disclosure is concerned with the intelligent bolts 1104 to 1106 including the sensor arrangements for determining a pre-load in the intelligent bolts 1104 to 1106, and for wirelessly communicating sensed measurement data to a database in the computing device 1110.

Figure 12:
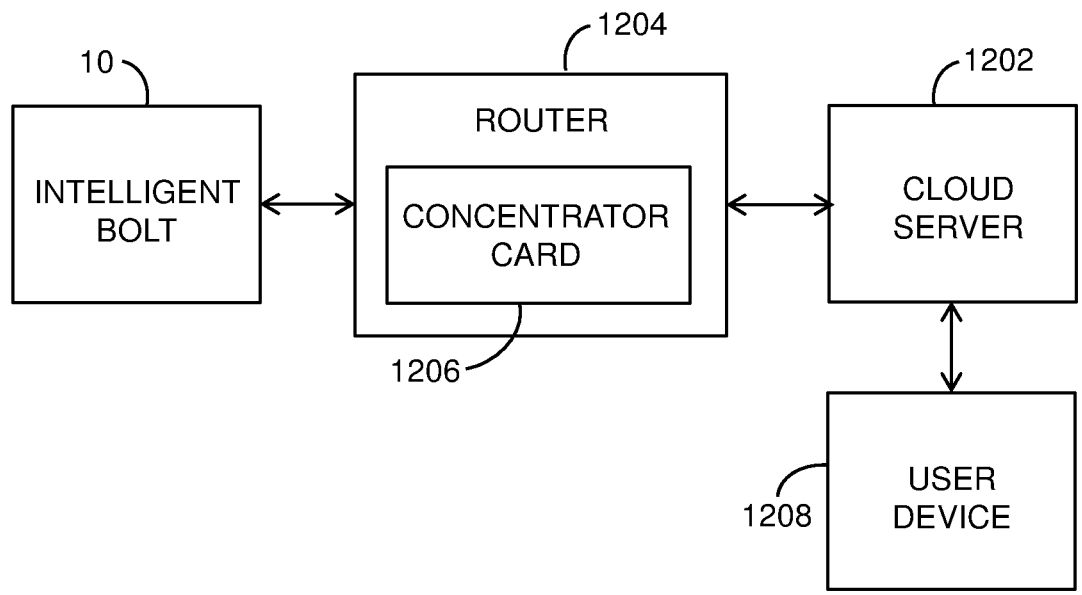
FIGS. 12, 13, and 14 illustrate exemplary implementations of an intelligent bolt in communication with at least one remote device, in accordance with various embodiments of the present disclosure.
Figure 13:
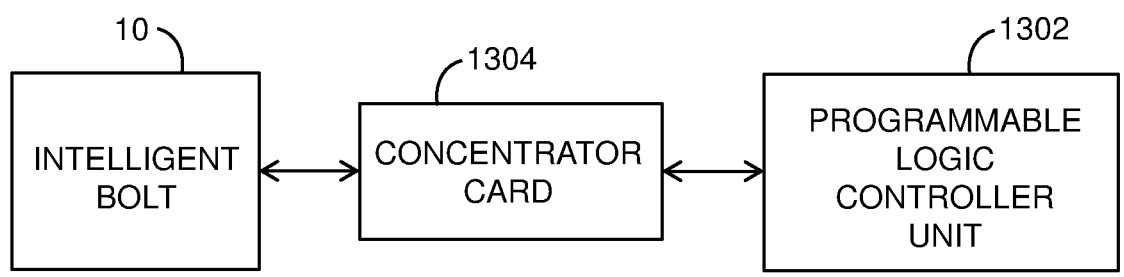
Figure 14:
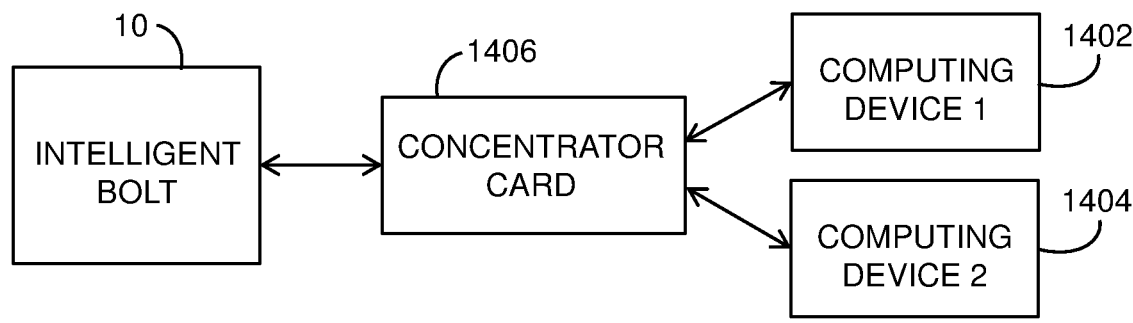

Referring to FIGS. 12, 13, and 14, illustrated are exemplary implementations of the intelligent bolt 10 in communication with at least one remote device, in accordance with various embodiments of the present disclosure. It may be understood by a person skilled in the art that the FIGS. 12, 13, and 14 include simplified arrangements for implementation of the intelligent bolt 10 for sake of clarity, which should not unduly limit the scope of the claims herein. The person skilled in the art will recognize many variations, alternatives, and modifications of embodiments of the present disclosure.

Referring to FIG. 12, illustrated is an exemplary implementation of the intelligent bolt 10 in communication with at least one remote device, depicted as a cloud server 1202, in accordance with an embodiment of the present disclosure. In such an instance, the intelligent bolt 10 is communicably coupled to the cloud server 1202 via a communication network (not shown). As an example, a sensor arrangement (not shown) of the intelligent bolt 10 may be operable to transmit a stress measurement signal to the cloud server 1202. Furthermore, optionally, the intelligent bolt 10 is communicably coupled to the cloud server 1202 via network devices such as a router 1204 and a concentrator card 1206 associated with the router 1204. Therefore, in such an implementation, the intelligent bolt 10 transmits the stress measurement signal to the router 1204, wherefrom the stress measurement signal is transmitted to the cloud server 1202. As shown, the cloud server 1202 is also communicably coupled to a user device 1208 associated with an end user of the intelligent bolt 10. The user may utilize the user device 1208 to access the cloud server 1202, in order to control the intelligent bolt 10.

Referring to FIG. 13, illustrated is an exemplary implementation of the intelligent bolt 10 in communication with at least one remote device, depicted as a Programmable Logic Controller (PLC) unit 1302, in accordance with another embodiment of the present disclosure. The intelligent bolt 10 is communicably coupled to the Programmable Logic Controller (PLC) unit 1302 via a communication network (not shown). As an example, a sensor arrangement (not shown) of the intelligent bolt 10 may be operable to transmit a stress measurement signal to the Programmable Logic Controller (PLC) unit 1302. Furthermore, optionally, the intelligent bolt 10 is communicably coupled to the Programmable Logic Controller (PLC) unit 1302 via a network device such as a concentrator card 1304. Therefore, in such an implementation, the intelligent bolt 10 transmits the stress measurement signal to the concentrator card 1304, wherefrom the stress measurement signal is optionally processed and transmitted to the Programmable Logic Controller (PLC) unit 1302.

Referring to FIG. 14, illustrated is an exemplary implementation of the intelligent bolt 10 in communication with at least one remote device, depicted as a plurality of computing devices 1402 and 1404, in accordance with yet another embodiment of the present disclosure. The intelligent bolt 10 is communicably coupled to the plurality of computing devices 1402 and 1404 via a communication network (not shown). As an example, the communication network may be a Controller Area Network (CAN) or a Local Interconnected Network (LIN) system. Furthermore, as shown, the intelligent bolt 10 is communicably coupled to the plurality of computing devices 1402 and 1404 via network device such as a concentrator card 1406. Therefore, in such an implementation, the intelligent bolt 10 transmits data pertaining thereto, to the concentrator card 1406, wherefrom the data pertaining to the intelligent bolt 10 is optionally processed and transmitted to the plurality of computing devices 1402 and 1404.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

The invention claimed is:

1. An intelligent bolt including a head region coupled to a threaded region, wherein the head region includes a bolt cavity, wherein a distance between the head region and a bottom end of the bolt cavity changes in operation as a function of a longitudinal stress applied between the threaded region and the head region, and wherein the intelligent bolt includes a sensor arrangement for measuring changes in the distance between the head region and the bottom end of the bolt cavity, wherein:
   the sensor arrangement is mounted in the head region, such that the sensor arrangement is spatially referenced in respect of the head region; and
   a distal end of the sensor arrangement is disposed adjacent to the bottom end of the bolt cavity to define a gap therebetween, such that the gap varies in size in response to changes in spatial position of the bottom end of the bolt cavity relative to the distal end of the sensor arrangement as a function of changes in a longitudinal stress applied to the intelligent bolt, wherein interrogating radiation transmission in operation via the gap from a source of interrogating radiation of the sensor arrangement to a corresponding radiation sensor of the sensor arrangement generates a stress measurement signal from the radiation sensor that is processed within the sensor arrangement for wireless communication from the intelligent bolt.

2. The intelligent bolt of claim 1, wherein the bolt cavity extends from the head region into the threaded region.

3. The intelligent bolt of claim 1, wherein the sensor arrangement is mounted within a recess of the head region, and the bolt cavity extends from a bottom surface of the recess into the intelligent bolt.

4. The intelligent bolt of claim 1, wherein the sensor arrangement includes a power supply arrangement and a data processing arrangement, wherein the data processing arrangement is provided in operation with power from the power supply arrangement, and wherein the data processing arrangement is operable to function in at least a sleep state and an active state, wherein the data processing arrangement is operable to process the stress measurement signal to generate corresponding measurement data and to transmit the measurement data wirelessly from the intelligent bolt when in the active state, and to conserve power when in the sleep state by ceasing sending wireless transmissions from the intelligent bolt.

5. The intelligent bolt of claim 4, wherein the sensor arrangement is operable to switch between the sleep state and the active state in a cyclical manner, to provide a temporal sequence of stress measurement data transmitted wirelessly from the intelligent bolt.

6. The intelligent bolt of claim 4, wherein the sensor arrangement is in an initial dormant state, and is switchable for use into one or more of the sleep state and the active state.

7. The intelligent bolt of claim 4, wherein the sensor arrangement consumes in the sleep state less than 1% of power consumed by the sensor arrangement in the active state.

8. The intelligent bolt of claim 4, wherein the sensor arrangement consumes in the sleep state less than 0.1% of power consumed by the sensor arrangement in the active state.

9. The intelligent bolt of claim 4, wherein the sensor arrangement is operable to be temporally more than 99% of its operating time in the relative to the active state.

10. The intelligent bolt of claim 4, wherein the sensor arrangement includes a digital clock for defining a period between repetitions of the state being employed.

11. The intelligent bolt of claim 4, wherein the data processing arrangement is configured to:
   process the stress measurement signal by using a differential measurement of radiation from the source of interrogating radiation using a first element and a second element wherein the first element provides a measure of a magnitude of radiation from the source of interrogating radiation, and the second elements provides a measure of radiation from the source of interrogating radiation transmitted via the gap; and
   process the stress measurement signal by linearization of measurement results using at least one of a spline algorithm.

12. The intelligent bolt of claim 1, wherein the sensor arrangement includes a power supply arrangement including a battery.

13. The intelligent bolt of claim 12, wherein the power supply arrangement further includes a power harvesting arrangement for harvesting energy from an external environment to the intelligent bolt, wherein the power harvesting arrangement includes at least one of: a solar collector, a resonant inductive charger, a wireless energy charger including a voltage step-up transformer arrangement.

14. The intelligent bolt of claim 1, wherein the sensor arrangement includes an antenna arrangement that is disposed at an upper exposed surface of the sensor arrangement when mounted within the head region.

15. The intelligent bolt of claim 1, wherein the sensor arrangement is implemented as a unitary component that is installed by insertion of at least a portion of the sensor arrangement into the bolt cavity.

16. The intelligent bolt of claim 1, wherein the sensor arrangement is configured to implement wireless communication of the processed stress measurement signal in a peer-to-peer (P2P) manner, and that the sensor arrangement is configured to function as a peer-to-peer (P2P) communication node for relaying peer-to-peer (P2P) transmissions.

17. The intelligent bolt of claim 1, wherein the intelligent bolt has its head region and its threaded region fabricated from at least one of: a metal, a metal alloy, a sintered metal powder material, a ceramic material, a plastics material, a polymeric material, an amorphous material.

18. The intelligent bolt of claim 1, wherein the intelligent bolt is arranged to be operable in an aquatic environment, and to transmit its processed measurement signal via a conductive communication path external to the intelligent bolt using capacitive coupling of its processed measurement signal from the sensor arrangement to the conductive communication path.

19. The intelligent bolt of claim 1, wherein the sensor arrangement is encapsulated in a polymeric plastics material, and is secured within the intelligent bolt using adhesive.

20. The intelligent bolt of claim 1, wherein the sensor arrangement further comprises:
   the source of interrogating radiation for illuminating the bottom end of the bolt cavity;
   the radiation sensor for receiving radiation returned from the bottom end of the bolt cavity for measuring an elongation of the intelligent bolt;
   a data processing arrangement for receiving the measurement signal from the radiation sensor, wherein the data processing arrangement is provided with wireless communication functionality by employing a low-power microcontroller with an in-built wireless communication functionality; and
   a power supply arrangement, for providing operating electrical power for the data processing arrangement and the source of interrogating radiation, wherein the power supply arrangement further comprises at least one of: a plurality of capacitors, a plurality of non-rechargeable batteries, a plurality of rechargeable batteries, a plurality of solar cells, a plurality of resonant inductive power coupling arrangements for providing power to the intelligent bolt.

21. The intelligent bolt of claim 20, wherein the in-built wireless communication functionality is provided by using BlueTooth®.

22. The intelligent bolt of claim 1, wherein the source of interrogating radiation further comprises at least one of a solid-state laser, a light emitting diode, and a nanowire radiation source.

23. The intelligent bolt of claim 1, wherein the intelligent bolt is communicably coupled to at least one remote device via a communication network, and wherein the intelligent bolt is operable to transmit data pertaining thereto, to the at least one remote device, wherein the data pertaining to the intelligent bolt comprises at least one of: (i) the stress measurement signal, (ii) the processed stress measurement signal, (ii) operating state of the intelligent bolt, further wherein the at least one remote device is operable to process the data pertaining to the intelligent bolt, to monitor and/or control the intelligent bolt.

24. The intelligent bolt of claim 23, wherein the at least one remote device is operable to store the data pertaining to the intelligent bolt.

25. The intelligent bolt of claim 23, wherein the at least one remote device is selected from a group consisting of: a computing device, a server, a database, an Internet of Things (IoT) device, a Programmable Logic Controller (PLC) unit.

26. A method of using an intelligent bolt including a head region coupled to a threaded region, wherein the head region includes a bolt cavity, wherein a distance between the head region and a bottom end of the bolt cavity changes in operation as a function of longitudinal stress applied between the threaded region and the head region, and wherein the intelligent bolt includes a sensor arrangement for measuring changes in the distance between the head region and the bottom end of the bolt cavity, wherein the method includes:
   arranging for the sensor arrangement to be mounted in the head region such that the sensor arrangement is spatially referenced in respect of the head region; and
   arranging for a distal end of the sensor arrangement to be disposed adjacent to the bottom end of the bolt cavity to define a gap therebetween, such that a size of the gap changes in response to changes in spatial position of the bottom end of the bolt cavity relative to the distal end of the sensor arrangement that occur as a function of changes in longitudinal stress applied to the intelligent bolt, wherein interrogating radiation transmission in operation via the gap from a source of interrogating radiation of the sensor arrangement to a corresponding radiation sensor of the sensor arrangement generates a stress measurement signal from the radiation sensor that is processed within the sensor arrangement for wireless communication from the intelligent bolt.

27. A computer program product comprising a non-transitory computer-readable storage medium having computer-readable instructions stored thereon, the computer-readable instructions being executable by a computerized device comprising processing hardware to execute a method as claimed in claim 26.

28. A sensor arrangement for the intelligent bolt of claim 1, wherein the sensor arrangement is mountable in a bolt cavity of an intelligent bolt including a head region coupled to a threaded region, wherein a distance between the head region and a bottom end of the bolt cavity changes in operation as a function of longitudinal stress applied between the threaded region and the head region, and wherein the sensor arrangement is operable to measure changes in the distance between the head region and the bottom end of the bolt cavity, wherein:
   the sensor arrangement is mountable in the head region such that the sensor arrangement is spatially referenced in respect of the head region; and
   the sensor arrangement is mountable so that the distal end of the sensor arrangement is disposed adjacent to the bottom end of the bolt cavity to define a gap therebetween, such that changes in spatial position of the bottom end of the bolt cavity relative to the distal end of the sensor arrangement occur as a function of changes in longitudinal stress applied to the intelligent bolt to vary a size of the gap wherein the sensor arrangement is operable to provide for interrogating radiation transmission in operation via the gap from a source of interrogating radiation of the sensor arrangement to a corresponding radiation sensor of the sensor arrangement to generate a stress measurement signal from the radiation sensor that is processable within the sensor arrangement for wireless communication from the intelligent bolt.

29. A sensor arrangement for mounting in a bolt, the sensor arrangement comprising:

a source of interrogating radiation for illuminating a bottom end of a bolt cavity of the bolt;

a sensor for receiving radiation returned from the bottom end of the bolt cavity for measuring an elongation of the bolt, wherein the sensor further comprises a transmitter, a receiver, and a reference receiver;

a data processing arrangement for receiving a measurement signal from the sensor, wherein the data processing arrangement is provided with wireless communication functionality by employing a low-power microcontroller with in-built wireless communication functionality; and a power supply arrangement for providing operating electrical power for the data processing arrangement and the source of interrogating radiation, wherein the power supply arrangement further comprises at least one of a plurality of capacitors, a plurality of non-rechargeable batteries, a plurality of rechargeable batteries, a plurality of solar cells, a plurality of resonant inductive power coupling arrangements for providing power to the bolt.

\* \* \* \* \*